(12) United States Patent
Yamazaki et al.

(10) Patent No.: US 7,869,654 B2
(45) Date of Patent: Jan. 11, 2011

(54) ELECTRIC PAPER READING SYSTEM

(75) Inventors: Yoshiro Yamazaki, Kanagawa (JP); Setsuji Tatsumi, Kanagawa (JP); Kanji Nagashima, Kanagawa (JP); Seiichiro Oku, Kanagawa (JP); Toshiya Kojima, Kanagawa (JP); Kenichi Kodama, Kanagawa (JP); Seiichi Inoue, Kanagawa (JP); Naoki Kusunoki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/349,346

(22) Filed: Jan. 6, 2009

(65) Prior Publication Data

US 2009/0152024 A1 Jun. 18, 2009

Related U.S. Application Data

(62) Division of application No. 10/764,506, filed on Jan. 27, 2004, now Pat. No. 7,492,945.

(30) Foreign Application Priority Data

Jan. 28, 2003 (JP) .............................. 2003-018284

(51) Int. Cl.
*G06K 9/00* (2006.01)
(52) U.S. Cl. ................................................. 382/187
(58) Field of Classification Search ......... 382/180–189, 382/305, 175, 135–139, 321, 282–283; 347/100–101; 715/221–226; 358/537–538, 452–453, 462
See application file for complete search history.

(56) References Cited

U.S. PATENT DOCUMENTS

| | | | |
|---|---|---|---|
| 5,038,218 A | | 8/1991 | Matsumoto |
| 5,694,494 A | * | 12/1997 | Hart et al. .................... 382/305 |
| 6,330,357 B1 | * | 12/2001 | Elmenhurst et al. ......... 382/175 |
| 6,379,001 B1 | * | 4/2002 | Tomida et al. .............. 347/100 |

(Continued)

FOREIGN PATENT DOCUMENTS

JP 61013867 A 1/1986

(Continued)

OTHER PUBLICATIONS

Zenon Pylyshyn, Seeing and Visualizing: It's Not What You Think, Sep. 27, 2002, Rutgers Center for Cognitive Science, Retrieved from the Internet< URL: http://ruccs.rutgers.edu/faculty/pylyshyn/bookall.pdf.

*Primary Examiner*—Sherali Ishrat
(74) *Attorney, Agent, or Firm*—Sughrue Mion, PLLC

(57) ABSTRACT

Objects of the present invention are to facilitate filling out by hand an electronic paper and to realize digitization of contents with which the electronic paper is filled out by hand with a simple structure. A read image is obtained by optically reading a reading-object of the electronic paper. Based on the document information written on the electronic paper and writing-conditions during document writing, which are represented by the document information, a display image of the document in accordance with the read image information is formed. A written image is separated and extracted by converting a density only of pixels among the respective pixels of the read image, whose densities vary in accordance with the document writing and which correspond to a portion, to which ink of a pen for the handwriting is not adhered.

2 Claims, 14 Drawing Sheets

U.S. PATENT DOCUMENTS 6,741,737 B1    5/2004  Lenoir
7,551,778 B2 *  6/2009  Miyatake et al. ............ 382/180

FOREIGN PATENT DOCUMENTS

| | | | |
|---|---|---|---|
| JP | 06290296 A | 10/1994 | |
| JP | 2000-112646 A | 4/2000 | |
| JP | 2001-312250 A | 11/2001 | |

* cited by examiner

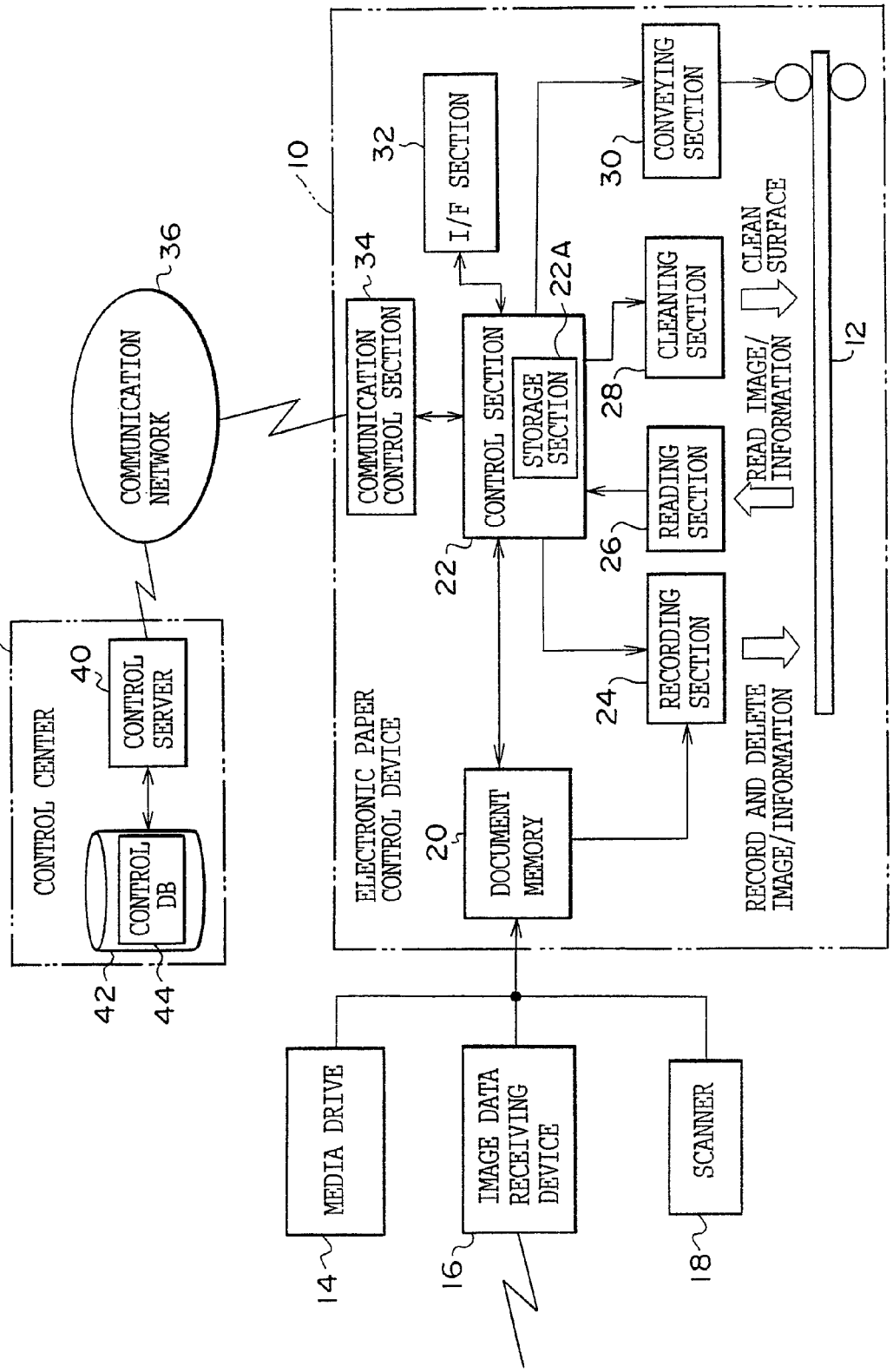

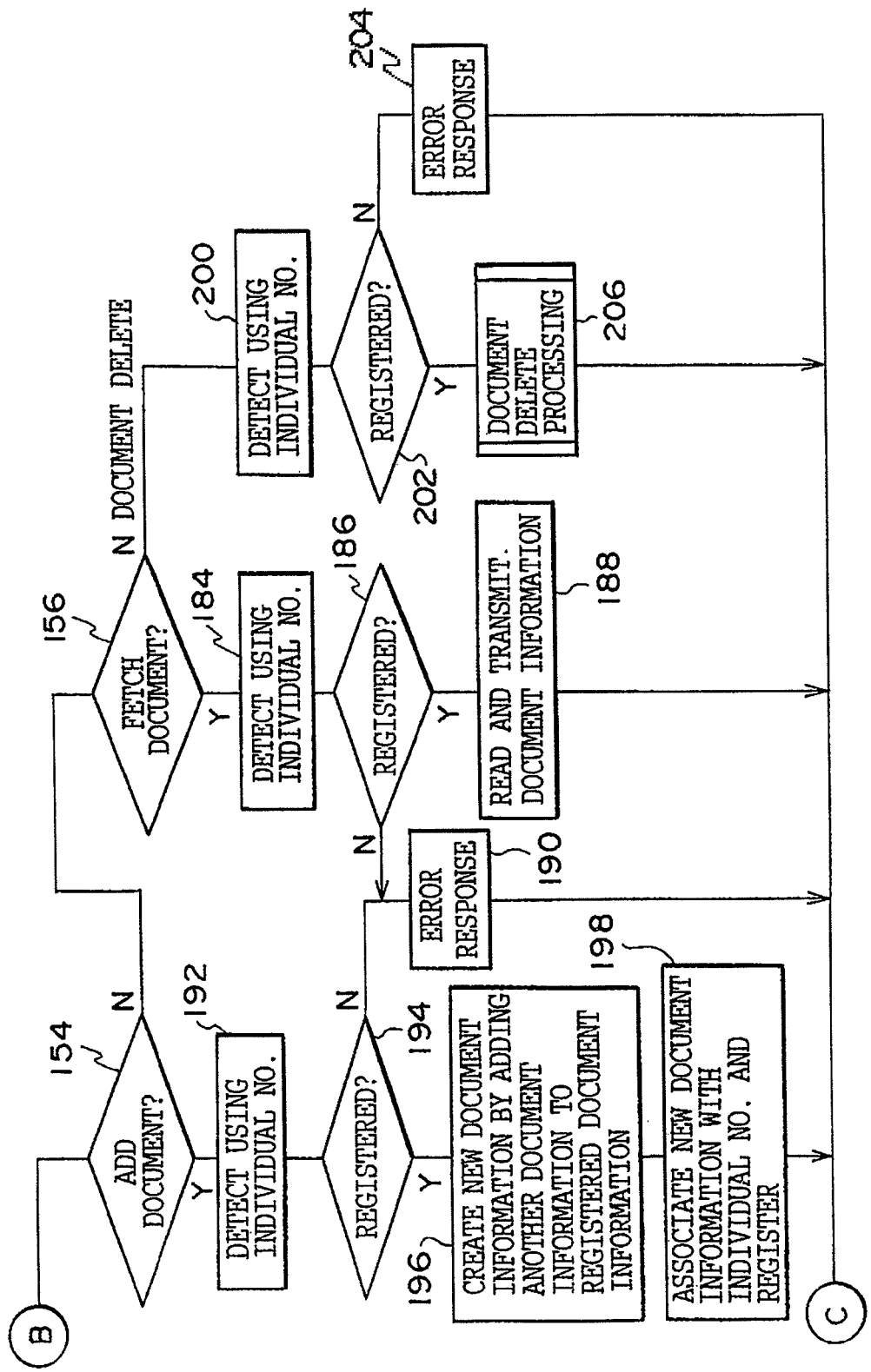

EXAMPLE OF UNIT PATTERNS OF TEST PATTERN $d1 < d2 < d3 < d4$

EXAMPLE OF TEST PATTERN

SPECTRAL REFLECTANCE CHARACTERISTICS OF IMAGE RECORDING PORTION /NON-IMAGE PORTION OF ELECTRONIC PAPER AND INK

SPECTRAL REFLECTANCE CHARACTERISTICS OF READING PORTION

SEPARATE WRITTEN CONTENTS BY IMAGE PROCESSING : USE OF CH1
SEPARATE WRITTEN CONTENTS DURING READING : USE OF CH2

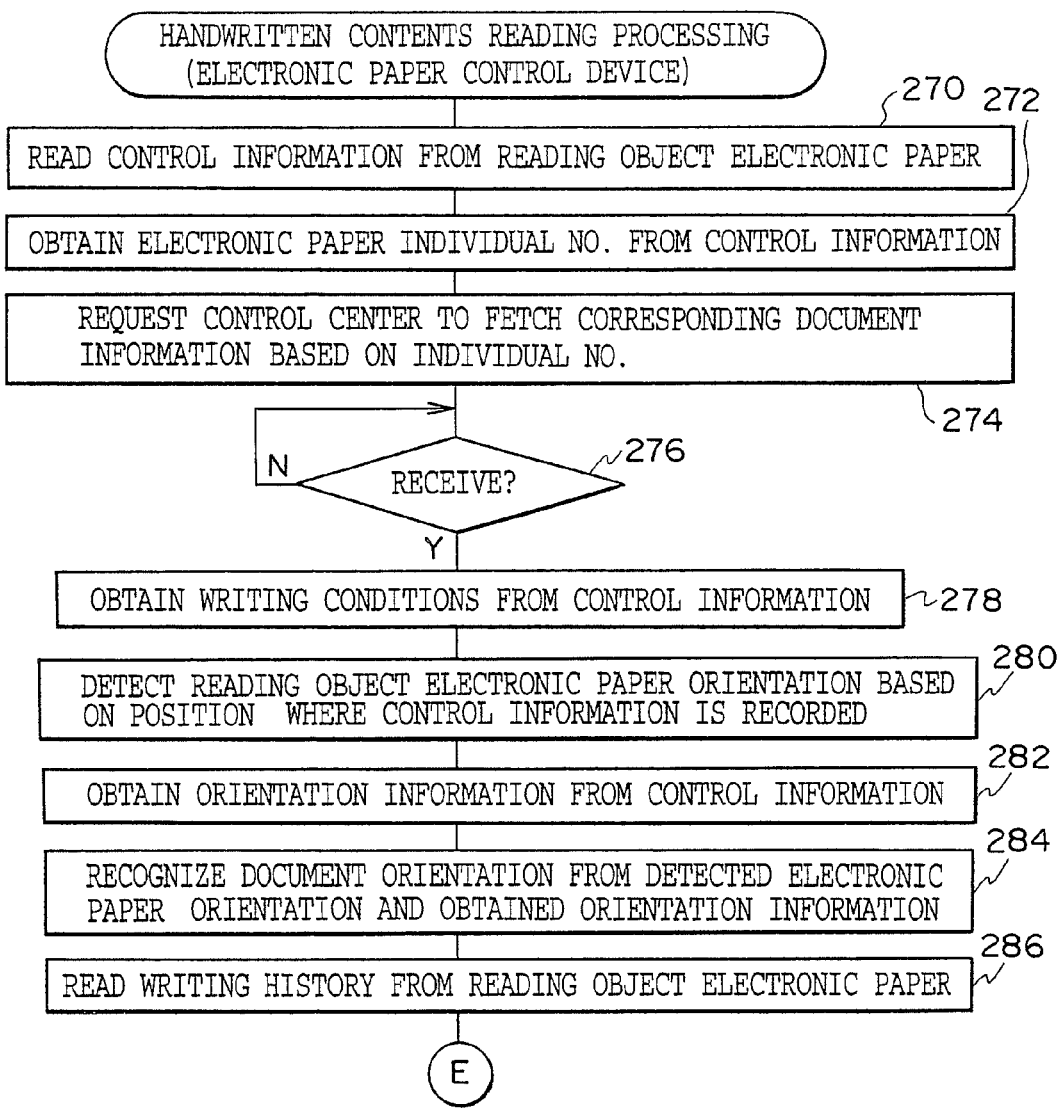

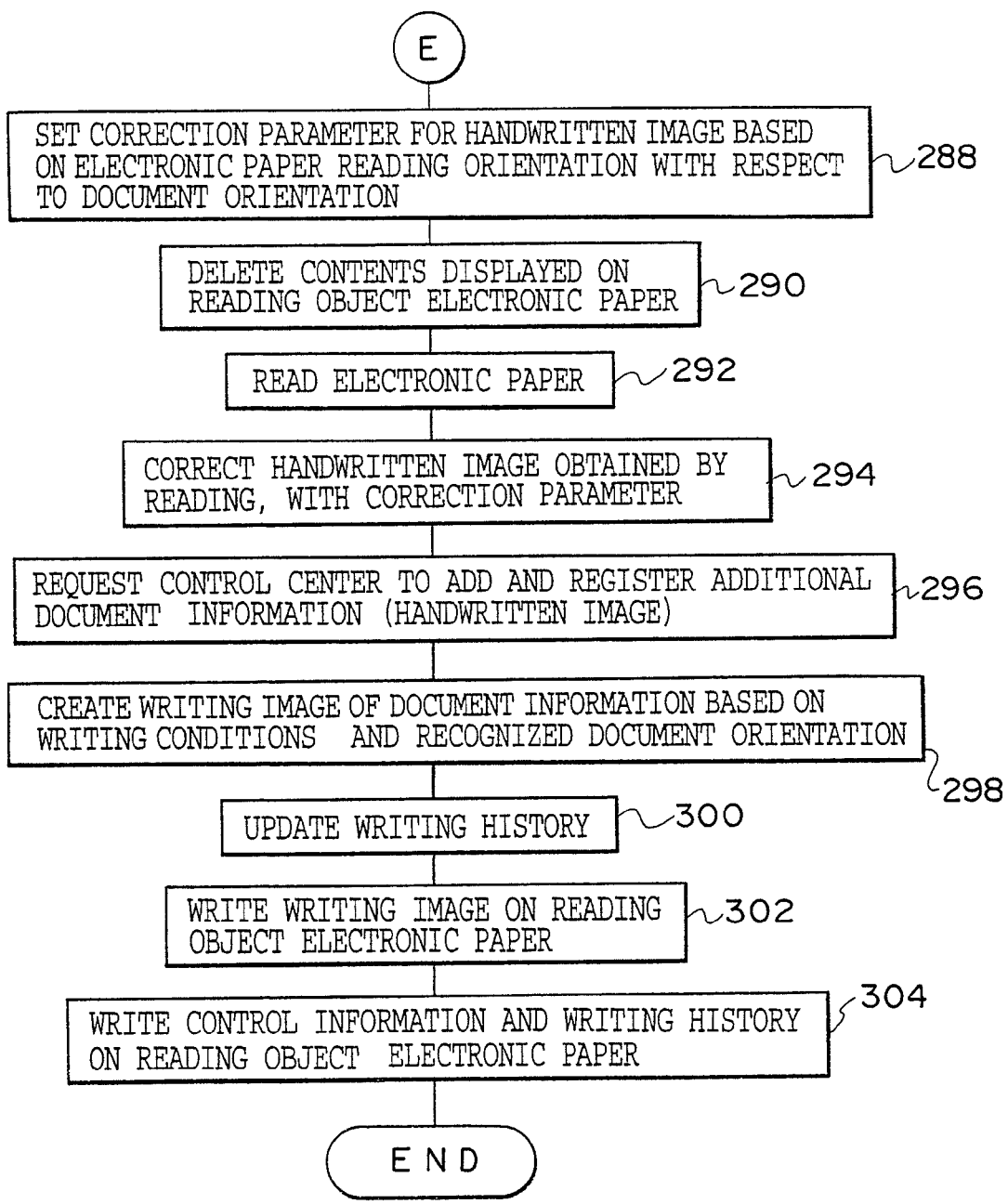

ELECTRIC PAPER READING SYSTEM

CROSS-REFERENCE TO RELATED APPLICATION

This is a divisional of application Ser. No. 10/764,506 filed Jan. 27, 2004 now U.S. Pat. No. 7,492,945, which claims priority from Japanese Patent application No. 2003-018284 filed Jan. 28, 2003. The entire disclosures of the prior applications, are considered part of the disclosure of the accompanying divisional application and are hereby incorporated by reference.

BACKGROUND OF THE INVENTION

1. Field of the Invention

The present invention relates to an electronic paper reading device, an electronic paper reading system, and an electronic paper reading method. More particularly, the present invention relates to an electronic paper reading device, an electronic paper reading system, and an electronic paper reading method for reading contents, which have been filled out onto electronic paper by hand.

2. Description of the Related Art

In recent years, attention has been paid to electronic paper (also called "digital paper") as anew recording media. Electronic paper has characteristics such that an arbitrary image (which could be an image of characters) can be recorded thereon, and an image, which has been recorded once thereon, can be rewritten. It is hoped that electronic paper will even replace paper as a recording medium. Paper has characteristics such that, even after an image has been once recorded on the paper, characters or the like can be additionally filled out by hand thereon, by using writing-implements such as pencils or ball-point pens. Accordingly, in order for electronic paper to be used as a medium that replaces paper, the electronic paper must, like paper, enable characters or graphics to be filled out by hand on electronic paper on which an image has already been recorded. Further, the ability to reuse a display or the like of contents, which have been filled out by hand, as an image on the electronic paper, by digitizing the contents, which have been filled out by hand, is desired.

Techniques for digitizing contents, which are filled out on electronic paper by hand, have conventionally been proposed. For example, Japanese Patent Application Laid-Open No. 2000-112646 discloses an information-processing device which, if an image (including characters) is written/inputted, using an electromagnetic/heat-generating pen, onto electronic paper which is fixed on an electromagnetic inductive digitizer (tablet) digitizes contents which has been written on the electronic paper by the electromagnetic inductive digitizer, associates information, which was obtained by digitization, with ID information for identifying respective documents, and stores the associated information therein.

However, in the technique described in JP-A No. 2000-112646, in order to enable an electronic paper to be filled out by hand and the contents with which the electronic paper is filled out by hand to be digitized, it becomes necessary to use special devices such as the electromagnetic inductive digitizer, and the electromagnetic/heat-generating pen which radiates an electromagnetic wave and generates heat during the filling-out by hand of contents on electronic paper. Further, if electronic paper is filled out by hand, it is also necessary to fix the electronic paper at a predetermined position on the digitizer thus making it inconvenient to use the electronic paper. Moreover, since the electromagnetic/heat-generating pen is a power-consuming device, it must be used while paying constant attention to a remaining amount of a battery in order to prevent writing in-ability due to battery run-down.

SUMMARY OF THE INVENTION

In view of the aforementioned facts, an object of the present invention is to obtain an electronic paper reading device in which filling-out by hand on an electronic paper can be performed easily and digitization of contents with which the electronic paper filled out is by hand can be realized with a simple structure.

In order to attain the aforementioned object, a first aspect of the present invention is an electronic paper reading device comprising a reading component for optically reading an electronic paper which is filled out by hand, in a state in which a first image which has been recorded on the electronic paper in advance, is being displayed, a recognition component for recognizing the first image, and an extracting component for extracting image data of a second image that represents contents with which the electronic paper is filled out by hand, based on a result of the recognition of the first image by the recognition component, from a result of the reading by the reading component.

In accordance with the first aspect of the present invention, an electronic paper which is filled out by hand is optically read by the reading component in a state in which a first image which has been recorded in advance on the electronic paper is displayed. Thus, in the first aspect of the present invention, the electronic paper is optically read, whereby the contents with which the electronic paper is filled out by hand is digitized. Therefore, when the electronic paper is filled out by hand, it is possible to use a tool which alters optical characteristics (such as a light reflectance and the like) at a portion of the electronic paper which is filled out by hand, for example, a pen which is highly in general use and structured such that a medium is filled out by being deposited with ink. Accordingly, use of a special device such as an electro-magnetic/heat-generating pen becomes unnecessary.

By optically reading the electronic paper, the timing when contents with which the electronic paper is filled out by hand are read is not limited to the timing at which the electronic paper is filled out as in the case in which the electronic paper is read by a digitizer, and the contents can be read after the filling-out by hand on the electronic paper has been completed. Accordingly, during the filling-out by hand on the electronic paper, fixing of the electronic paper at a predetermined position of the digitizer is not required. Consequently, the filling-out by hand on the electronic paper can be facilitated.

The reading component according to the first aspect of the present invention reads the electronic paper on which the first image has already been recorded and which is further filled out by hand. Therefore, the reading result by the reading component represents an overlapped image of the contents with which the electronic paper is filled out by hand and the first image. Accordingly, in the first aspect of the present invention, the recognition component recognizes the first image that is recorded on the electronic paper, and the extracting component extracts image data of a second image that represents contents with which the electronic paper is filled out by hand, based on the recognizing result of the first image by the recognition component and the reading result due to the reading component.

Since the reading component according to the first aspect of the present invention can use a general reading component such as a scanner, in the first aspect of the present invention, use of a special device such as a digitizer is not necessary in order to digitize contents with which the electronic paper is filled out by hand. Accordingly, in accordance with the first aspect of the present invention, the filling-out by hand on an electronic paper is facilitated and digitization of contents with which the electronic paper is filled out by hand can be realized with a simple structure.

In the first aspect of the present invention, in extracting the image data of the second image, for example, by the recognition component recognizing the first image by obtaining the image data of the first image and by the extracting component estimating the first image in accordance with the reading result by the reading component based on the image data obtained by the recognition component, and then removing the estimated first image from the image represented by the reading result. In estimating the first image, when the first image is recorded on the electronic paper, if a processing such as a scaling of the first image or an adjustment of a recording position of the first image is carried out, a processing for estimating the first image which is recorded on the electronic paper based on the original image data of the first image is also included. Such processings can be performed based on information that indicates the way in which the first image is recorded on the electronic paper. Accordingly, the second image which represents contents with which the electronic paper is filled out by hand can be obtained with high accuracy by estimating the first image in accordance with the reading result and removing the first image that is estimated based on the image represented by the reading result.

It is preferable that identification information for identifying image data of the first image or a storage location at which the image data is stored is recorded on the electronic paper (for example, in an aspect in which image data is stored in a predetermined storage medium (e.g., storage medium which is connected to a server), information or the like which is associated with information that indicates a storage address or image data). The information can be optically recorded on the electronic paper in a formation of one or two-dimensional barcode or can be recorded on an information recording section such as an IC chip which is mounted on the electronic paper.

If the image data or the identification information is recorded on the electronic paper, the recognition component can be structured, for example, such that the recognition component obtains image data by reading the image data from the electronic paper or identifies a storage location of the image data based on the identification information that is read from the electronic paper, whereby image data can be obtained from the identified storage location.

The removal of the estimated first image from the image represented by the reading result can be realized by converting a density of pixels corresponding to the estimated first image, among respective pixels of the image represented by the reading result, to a density of the electronic paper in the state in which no image is recorded thereon. However, among the respective pixels of the image represented by the reading result, if a density of the entire pixels corresponding to the first image is simply converted, contents with which the electronic paper is filled out by hand disappear at the overlapped portion of the contents with which the electronic paper is filled out by hand of the second image which is extracted by removing the first image which is estimated in accordance with the image represented by the reading result and the first image.

By considering the above-description, it is preferable to remove the estimated image from the image represented by the reading result such that, among the respective pixels of the image represented by the reading result, a density of the pixels which correspond to the estimated first image and whose density difference from the pixels which correspond to the estimated first image is less than a predetermined value or less or a density of the pixels within a range of density which is defined based on the estimated first image is converted to a density of the electronic paper on which image is not recorded thereon. Therefore, the pixels that correspond to the overlapped portion of the contents with which the electronic paper is filled out by hand and the first image are excluded from target pixels to be converted. Accordingly, when the second image is extracted by removing the first image from the image represented by the reading result, the occurrence of disappearance of the contents with which the electronic paper is filled out by hand from the extracted second image can be avoided.

An electronic paper reading device according to a second aspect of the present invention comprises a delete control component for deleting a display of a first image from an electronic paper which is filled out by hand in a state in which a first image which has been recorded on the electronic paper in advance, is being displayed, and a reading component for obtaining image data of a second image representing contents, with which the electronic paper is filled out by hand, by optically reading the electronic paper from which the display of the first image has been deleted by the delete control component.

In accordance with the second aspect of the present invention, the display of the first image is deleted by the delete control component from the electronic paper which is filled out by hand in the state in which the first image which has been recorded in advance on the electronic paper is displayed. Accordingly, the electronic paper is in the state of displaying only the contents with which the electronic paper is filled out by hand. Further, in order to delete the display of the first image by the delete control component, a processing in which a predetermined image whose density and color is uniform is displayed in place of the first image. If a predetermined image is displayed instead of the first image, since the predetermined image can be a background with respect to the contents with which the electronic paper is filled out by hand, the density and the color of the predetermined image can be defined so as to facilitate the contents with which the electronic paper is filled out by hand to be read by the reading component (for example, if the electronic paper is of a self-light emitting type, the density and the color of the predetermined image are defined so as to provide the background with a low brightness, or the like). Then, the reading component obtains image data of the second image that represents the contents with which the electronic paper is filled out by hand by optically reading the electronic paper from which the display of the first image has been deleted by the delete control component.

In this way, also in the second aspect of the present invention, since the electronic paper is optically read to digitize the contents with which the electronic paper is filled out by hand, when the electronic paper is filled out by hand, it is possible to use a tool which alters optical characteristics (such as a light reflectance and the like) at a portion of the electronic paper which is filled out by hand, for example, a pen which is highly in general use and structured such that a medium is filled out by being deposited with ink. Accordingly, use of a special device such as an electro-magnetic/heat-generating pen becomes unnecessary. Further, since the electronic paper can be read after the filling-out by hand on the electronic paper has been completed, when the electronic paper is filled out by hand, fixing of the electronic paper at a predetermined position on the digitizer becomes unnecessary. Consequently, the filling-out by hand on the electronic paper is facilitated.

Further, since the reading component according to the second aspect of the present invention optically reads the electronic paper in the state in which only the contents with which the electronic paper is filled out by hand is displayed thereon, the reading result by the reading component represents the second image which represents the contents with which the electronic paper is filled out by hand. Accordingly, image data of the second image can be obtained through the reading by the reading component. As the reading component according to the second aspect of the present invention can use a general reading component such as a scanner, also in the second aspect of the present invention, use of a special device such as a digitizer in order to digitalize contents with which electronic paper is filled out by hand becomes unnecessary. Consequently, in accordance with the second aspect of the present invention, the filling-out by hand on the electronic paper can be facilitated, and digitization of contents with which the electronic paper is filled out by hand can be realized with a simple structure.

An electronic paper reading device according to a third aspect of the present invention comprises a reading component for optically reading an electronic paper which is filled out by hand in a state in which a first image which is recorded in advance on the electronic paper is being displayed, wherein the electronic paper is filled out by hand by using ink having characteristics such that a reflectance of the ink is different from that of the electronic paper within a predetermined wavelength region in which a difference of at least one of a reflectance and a light emitting energy between a portion on the electronic paper at which the first image is recorded and a portion on the electronic paper at which the first image is not recorded is less than a predetermined value, and the reading component obtains image data of a second image that represents contents with which the electronic paper is filled out by hand by optically reading the electronic paper by using a sensor, which is sensitive to the predetermined wavelength region.

In accordance with the third aspect of the present invention, the electronic paper is filled out by hand by using ink having characteristics in which a reflectance of the ink is different from that of the electronic paper within a predetermined wavelength region in which a difference of a reflectance (in a case in which the electronic paper is of a reflective type) or a light emitting energy (in a case in which the electronic paper is of a self-light emitting type) between a portion at which the first image is recorded on the electronic paper and a portion at which the first image is not recorded thereon is less than a predetermined value. In the third aspect of the present invention, the electronic paper, which is filled out by hand by using the aforementioned ink, is optically read by the reading component.

In this way, also in the third aspect of the present invention, since the contents with which the electronic paper is filled out by hand is digitized by optically reading the electronic paper, when the electronic paper is filled out by hand, although ink itself is not in general use, any writing tool having a general structure such as a pen in which a medium is filled out by being deposited with ink can be used. Accordingly, use of special devices such as the electromagnetic/heat-generating pen and the like becomes unnecessary. Further, since the electronic paper can be read after the filling-out by hand on the electronic paper has been completed, when the electronic paper is filled out by hand, fixing of the electronic paper at a predetermined position on the digitizer becomes unnecessary. Consequently, the filling-out by hand on the electronic paper can be facilitated.

Since the reading component according to the third aspect of the present invention optically reads the electronic paper by a sensor which is sensitive to a predetermined wavelength, the reading result by the reading component represents the second image that represents the contents with which the electronic paper is filled out by hand, whereby image data of the second image can be obtained through the reading by the reading component. Further, the reading component according to the third aspect of the present invention, although a region of the sensitivity itself of the sensor is not general, can adopt the reading component having a general structure such as a scanner. Accordingly, also in the third aspect of the present invention, when contents with which the electronic paper is filled out by hand are digitized, use of a special device such as a digitizer becomes unnecessary. Consequently, the filling-out by hand on the electronic paper can be facilitated, and the digitization of contents with which the electronic paper is filled out by hand can be realized with a simple structure.

Any one of the first, second and third aspects of the present invention further comprises a control component which controls to recognize identification information for identifying the electronic paper which is filled out by hand, and associate the obtained image data of the second image with the recognized identification information.

The identification information for identifying the electronic paper, which is filled out by hand, is recognized by the control component. The identification information is recorded in advance on each electronic paper, and the identification information, which has been recorded, in advance on the electronic paper which is filled out by hand can be read and recognized. Alternatively, when image data of the second image is obtained, identification information is provided for the image data, and the identification information can be recorded on the corresponding electronic paper.

The control component controls to associate the obtained image data of the second image with the identification information. Accordingly, for example, when each of a plurality of image data of the second images obtained by optically reading each of a plurality of the electronic papers each of which is filled out by hand is controlled by the control component, a desired second image is detected by using identification information that corresponds to the desired second image as a key, whereby image data of the desired second image can be easily extracted. Consequently, reuse of the second image which is represented by the extracted image data (contents with which the electronic paper is filled out by hand) can be facilitated by displaying the second image on the electronic paper as an image, or the like.

It is desirable that the third aspect of the present invention further comprises a detection component for detecting a relationship between orientation of the electronic paper or the first image, and that of the second image, wherein, based on the relationship that is detected by the detection component, the control component controls the image data of the second image to orient the first image and the second image in the same direction when both of the first image and the second image are recorded on the electronic paper.

The relationship between the orientation of the electronic paper and that of the second image can be detected such that a mark indicating the orientation of the electronic paper (e.g. mark that points a vertical direction or a transverse direction of the electronic paper) or the like is recorded on the electronic paper beforehand. When the electronic paper is optically read, the mark is read at the same time. The orientation of the electronic paper is detected based on the mark or the like which is contained in the reading result. Accordingly, based on the detected orientation of the electronic paper, orientation of the second image obtained through the reading can be detected. Further, in an aspect in which the identification information for identifying image data of the first image or a storage location of the image data is recorded on the electronic paper, the information is previously recorded at a predetermined position on the electronic paper at which the orientation of the electronic paper can be determined (at a position at which the electronic paper is displaced from the center thereof). When the information is read, the recording position of the information is also detected, whereby the orientation of the electronic paper can be detected.

Regarding the relationship between the orientation of the first image and that of the second image, for example, when the first image is recorded on the electronic paper, the orientation of the first image is detected. The orientation of the first image in reference to the orientation of the electronic paper is detected and recorded. When the electronic paper which has been filled out by hand is optically read, the orientation of the electronic paper is detected, and the orientation of the first image is detected based on the orientation of the first image in reference to the orientation of the detected and recorded electronic paper. In reference to the detected orientation of the first image, the orientation of the second image obtained through the reading is determined. Accordingly, the relationship between the orientation of the first image and that of the second image can be detected.

Based on the relationship detected by the detection component, when the first image and the second image are recorded on the electronic paper, since the image data of the second image is controlled thereby allowing the first image and the second image to be oriented in the same direction (for example, information indicating the detected relationship by the detection component is stored or image data of the second image can be stored after receiving a rotational processing or the like in accordance with the detected relationship), even when the second image that represents contents with which the electronic paper is filled out by hand is redisplayed by being recorded as an image on the electronic paper, the second image can be displayed on the electronic paper in the same orientation as that when the electronic paper is filled out by hand.

A fourth aspect of the present invention is an electronic paper reading system, which comprises an electronic paper reading device, and a control device, wherein the electronic paper reading device and the control device are connected to each other via a network so as to be able to communicate with each other, the electronic paper reading device including a reading component for optically reading an electronic paper which is filled out by hand, in a state in which a first image which has been recorded on the electronic paper in advance, is being displayed, a recognition component for recognizing the first image, and an extracting component for extracting image data of a second image that represents contents with which the electronic paper is filled out by hand, based on a recognizing result of the first image by the recognition component and a reading result due to the reading component, and wherein the control device recognizes identification information for identifying the electronic paper which is filled out by hand, and associates the obtained image data of the second image with the identification information and manages the image data.

A fifth aspect of the present invention is an electronic paper reading method, which comprises the steps of (a) optically reading an electronic paper which is filled out by hand in a state in which a first image which has been recorded on the electronic paper in advance, is being displayed, (b) recognizing the first image, and (c) based on a recognized result from the first image in the step (b), extracting, from a result of the reading in the step (a), image data of a second image that represents contents with which the electronic paper is filled out by hand.

As described above, the present invention exhibits an excellent effect in that the electronic paper which is filled out by hand is optically read in a state in which the first image is displayed thereon, and based on the recognizing result of the first image, image data of the second image representing contents with which the electronic paper is filled out by hand is extracted from the reading result. Consequently, the filling-out by hand on the electronic paper is facilitated, and digitization of the contents with which the electronic paper is filled out by hand can be realized with a simple structure.

Further, the present invention exhibits an excellent effect in that a display of the first image is deleted from the electronic paper which is filled out by hand in a state in which the first image is displayed thereon, and the electronic paper from which the display of the first image has been deleted is optically read, whereby image data of the second image which represents contents with which the electronic paper is filled out by hand is obtained. Consequently, the filling-out by hand on the electronic paper is facilitated, and digitization of the contents with which the electronic paper is filled out by hand can be realized with a simple structure.

Moreover, the present invention exhibits an excellent effect in that, in the state in which a first image which is recorded in advance on the electronic paper is displayed, the electronic paper which is filled out by hand by using ink having characteristics in which a reflectance of the ink is different from that of the electronic paper within a predetermined wavelength region in which a difference of at least one of a reflectance and a light emitting energy between a portion at which the first image is recorded on the electronic paper and a portion at which the first image is not recorded thereon is less than a predetermined value is optically read by using a sensor which is sensitive to the predetermined wavelength region, whereby image data of the second image that represents the contents with which the electronic paper is filled out by hand is obtained. The filling-out by hand on the electronic paper is facilitated, and digitization of the contents with which the electronic paper is filled out by hand can be realized with a simple structure.

BRIEF DESCRIPTION OF THE DRAWINGS

FIG. 1 is a schematic structural block diagram illustrating an electronic paper control device according to an embodiment of the present invention;

FIGS. 3A and 3B are flowcharts each illustrating contents of document control processing;

FIGS. 9A and 9B are flowcharts each illustrating a written contents reading processing according to a second embodiment of the present invention.

DETAILED DESCRIPTION OF THE INVENTION

Figure 2A:
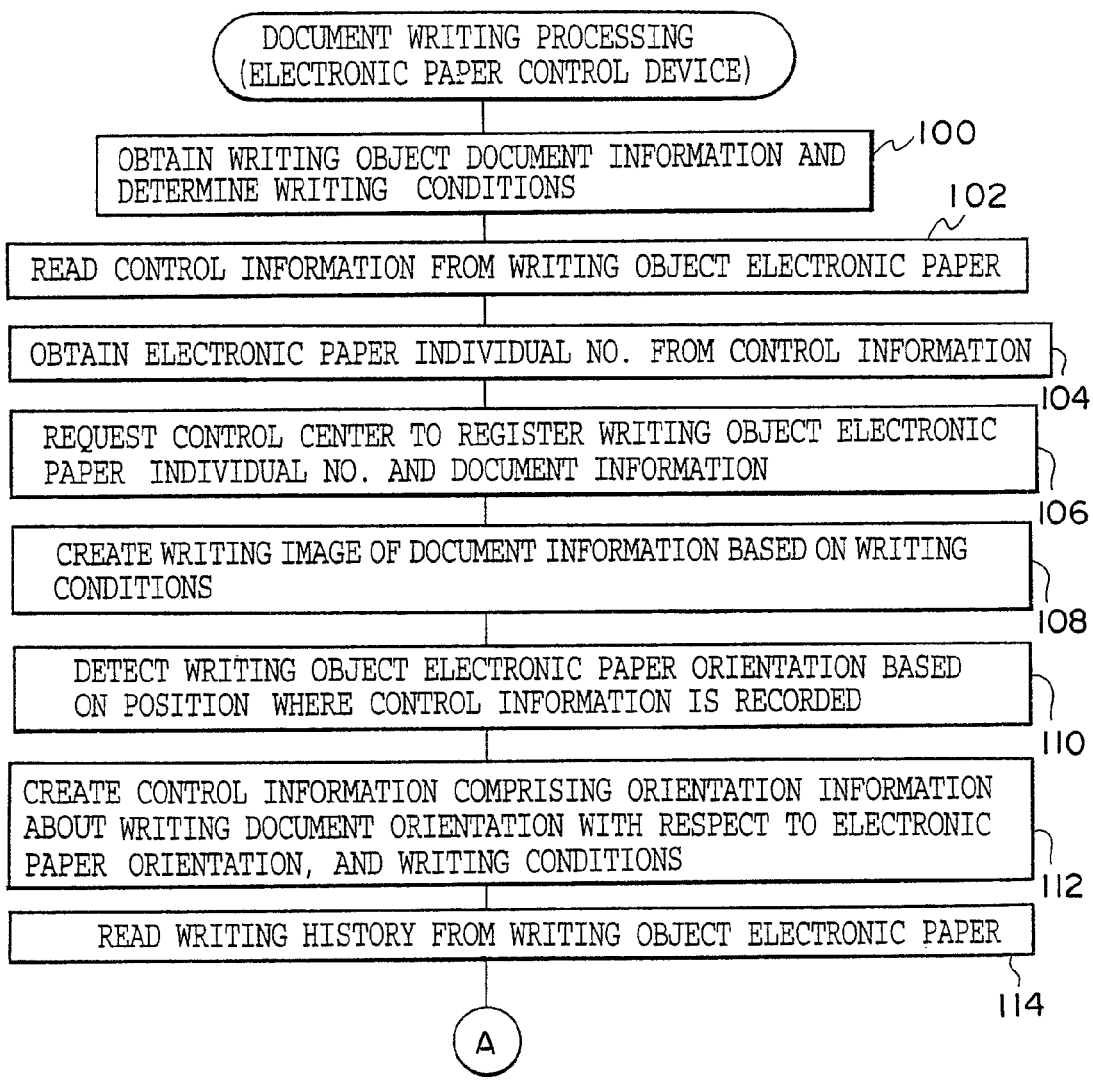
FIGS. 2A and 2B are flowcharts each illustrating contents of document writing processing.

With reference to drawings, a detailed description of an example of an embodiment of the present invention will be made hereinafter.

First Embodiment

FIG. 1 shows an electronic paper control device 10 according to a first embodiment of the present invention. The electronic paper control device 10 is a device for writing a document (image) on the electronic paper 12, reading of the document which is written on the electronic paper 12 or contents with which the electronic paper 12 is filled out by hand, and controlling writing/reading with respect to the electronic paper 12, and comprised as function of an electronic paper reading device according to the present invention. A media drive 14 as an inputting device for inputting image data, an image data receiving device 16, and a scanner 18 are respectively connected to the electronic paper control device 10.

One of various information storage media, for example, comprising a magnetic disk such as a flexible disk (FD), an optical disk such as a CD-R, an optomagnetic disk (MO), a smart media (R) which can be mounted to a digital still camera (DSC), a compact flash (R), and a memory stick (R) is set to the media drive 14. Document information indicating a document to be written on an electronic paper is stored in the set information storage medium. Further, the electronic paper control device 10 according to the present embodiment is able to write a document having arbitrary contents on the electronic paper 12, and handle arbitrary formatted data such as text data or image data (bit map or vector data, more specifically) as document information. The media drive 14 reads document information that is stored in the information storage medium, performs a predetermined processing (such as a decompression processing of data in a case in which the read document information is compressed image data) on the read document information as necessary, and outputs the document information.

Further, the image data receiving device 16 is connected to a computer network such as the Internet and receives document information indicating a document to be written on the electronic paper 12 from an information processing device (e.g. personal computer (PC)) via the computer network, performs a predetermined processing (such as a decompression processing of data in a case in which the received document information is compressed image data) on the received document information as necessary, and outputs document information.

The scanner 18 irradiates light to a transmissive original document such as a photographic film or a reflective original document such paper on which a document to be written (such as an image) has been recorded, photoelectrically converts light which has been transmitted to or reflected from the original document, to digitized bitmap image data by a reading sensor such as an CCD, performs a predetermined image processing (such as darkness correction, density conversion, shading correction or defective pixel correction) on the converted digitized bitmap image data, and outputs the bitmap image data as document information.

These inputting devices are connected to a document memory 20 of the electronic paper control device 10. Document information which has been input from one of the inputting devices to the electronic paper control device 10 is stored in the document memory 20. Further, a controlling section 22 and a recording section 24 are connected to the document memory 20.

The controlling section 22 is structured by a microcomputer comprising a CPU, an ROM, and an RAM, and an I/O port which are connected to one another via a bus. Further, the controlling section 22 comprises a nonvolatile storage section (e.g. a hard disk drive, an EEPROM or an RAM which is connected to a backup power supply) 22A. The storage section 22A stores therein a document writing program or a handwritten contents reading processing program for executing a document writing processing or a handwritten contents reading processing, respectively, which will be later described.

A conveying section 30 is connected to the controlling section 22. The electronic paper control device 10 is provided with a loading slot for inserting the electronic paper 12 into a machine body and also with an insertion detecting sensor for detecting that the electronic paper 12 was inserted into the machine body through the loading slot. When the insertion detecting sensor detects that the electronic paper 12 has been inserted, based on an instruction from the controlling section 22, the conveying section 30 conveys the inserted electronic paper 12 in a direction of the internal depth of the machine body (toward a position at which the recording section 24 and the reading section 26 are disposed).

When a document is written on the electronic paper 12, the controlling section 22 reads document information that indicates a document to be written on the electronic paper 12 which is an object to be written ("writing-object electronic paper", hereinafter) from the document memory 20, forms a writing image (such as bitmap data) of a document based on the read document information, and stores the writing image in the document memory 20. The controlling section 22 instructs the recording section 24 to be operated to read from the document memory 20 a writing image which corresponds to the document to be written on the writing-object electronic paper 12 when the writing-object electronic paper 12 is conveyed to a position of the recording section 24 at which the writing-object electronic paper 12 is positioned, and to write a document on the electronic paper 12 by a predetermined recording method based on the read writing image.

In order to record a document on the electronic paper 12 by the recording section 24, in accordance with a type of the writing-object electronic paper 12, a recording method can be adopted by the electronic paper control device 10. For example, if the writing-object electronic paper 12 is an electronic paper using a photo-writing electronic paper using a cholesteric liquid crystal, a recording method can be adopted by the recording method 24 in which light which is modulated for each pixel is irradiated onto the electronic paper to thereby write a document thereon. Further, for example, if the writing-object electronic paper 12 is an electronic paper using cataphoresis, a recording method can be adopted by the recording section 24 in which a voltage is applied to electrodes charged on the electronic paper 12 to thereby write a document thereon.

The recording section 24 comprises a function for deleting a document which was once written on the electronic paper 12 and a function for recording arbitrary attribute information (such as control information or writing history information which will be later described) other than the document which has been written on the electronic paper 12. Attribute information can be optically recorded by the same recording method as the recording method of a document. When attribute information is optically recorded on the electronic paper 12, it can be recorded in a form of code such as one or two-dimensional barcode or can be recorded as characters. Further, an IC chip is mounted on the electronic paper, and attribute information can be recorded on the IC chip.

When attribute information is optically recorded on the electronic paper 12, it is desired that attribute information is recorded at a position out of an image recording region on the electronic paper 12, and it is preferable that attribute information is recorded by using ink or the like having optical characteristics in which visibility is low and readability by a reading section 26, which will be described later, is high. Further, in order to record information on the IC chip, either of a non-contact type recording method in which a recording is carried out by using electromagnetic induction and radio, and a contact type recording method in which information is input to the IC chip via an IC chip connector can be adopted.

In the electronic paper 12 according to the present embodiment of the present invention, during the manufacture thereof, individual number for distinguishing electronic papers from each other is recorded on the electronic paper 12 in advance. The individual number can be recorded by one of the above-described recording methods. However, in order to prevent the structure of the reading section 26 which will be described later from being complicated, it is preferable that the recording section 24 is structured such that attribute information is recorded on the electronic paper 12 in the same recording method as that of the individual number on the electronic paper 12.

The reading section 26, which can read a document which is written on the electronic paper 12 or contents with which the electronic paper 12 is filled out by hand, attribute information, and an individual number, is connected to the controlling section 22. The reading section 26 irradiates light onto the electronic paper 12, and photo-electrically converts the light reflected (or transmitted) through the electronic paper 12 by using the reading sensor such as the CCD, and further converts converted data to digital data. Then, the reading section 26 forms image data representing the document which is written on the electronic paper 12 or contents with which the electronic paper 12 is filled out by hand, and outputs the image data to the controlling section 22.

A portion for reading attribute information or individual number, of the reading section 26 can adopt a structure in accordance with a recording method of attribute information on the electronic paper 12. For example, when attribute information is recorded on the electronic paper 12 as a one or two-dimensional barcode, the portion of the reading section 26 comprises a barcode reader which reads the recorded barcode and decodes attribute information or the like. When attribute information or the like is recorded as characters on the electronic paper 12, the portion of the reading section 26 can adopt a structure in which a region corresponding to characters which are recorded on the electronic paper 12 is extracted from image data which is obtained by optically reading the electronic paper 12, character recognition is carried out by using image data for the extracted region, and accordingly, attribute information or the like can be recognized. When attribute information or the like is recorded on the IC chip that is mounted on the electronic paper 12, the portion of the reading section 26 can adopt a structure in which attribute information or the like is read from the IC chip. Further, a method of reading attribute information from the IC chip can adopt either of a non-contact reading method and a contact reading method.

A cleaning section 28, which has a function to clean a surface of the electronic paper 12, is connected to the controlling section 22. A coating is applied onto a surface of the electronic paper 12 according to the present embodiment in order to facilitate removal of stains or dust deposited thereon or deletion of contents with which the surface of the electronic paper 12 is filled out by hand. The cleaning section 28 can adopt a cleaning method in which a coating on the surface of the electronic paper 12 is rinsed by using a rinsing solution. Further, in preparation for a case in which noticeable stain or dust is deposited on the surface of the electronic paper 12, it is preferable that the cleaning section 28 comprises a function of implementing a cleaning method in which, after a coating on the surface of the electronic paper 12 has been stripped off, another coating is reapplied onto the surface of the electronic paper 12.

An interface (I/F portion) 32 is connected to the controlling section 22. The I/F portion 32 comprises a display such as an LCD, which can display arbitrary information, and an operation panel having a plurality of keys. Further, when attribute information is recorded as characters on the electronic paper 12, a function of reading attribute information is not mounted on the reading section 26, and instead, characters indicating attribute information which is recorded on the electronic paper 12 can be read and inputted by a user via the operation panel of the I/F portion 32.

Further, a communication control section 34 is connected to the controlling section 22. The communication control section 34 is connected to a communication network 36 such as the Internet. On the other hand, a control server 40 of a control center 38 is connected to the communication network 36. Each of a plurality of the electronic paper control devices 10 (FIG. 1 shows one electronic paper control device 10 in order to prevent confusion of the figure), which are connected to the communication network 36, can communicate with the control server 40 via the communication network 36. A mass storage medium 42 such as an HDD (hard disk drive) is connected to the control server 40. The storage medium 42 stores therein a control DB (data base) 44 for controlling the respective electronic papers 12 on which each of a document is written by the electronic paper control device 10, with one electronic paper as a unit.

Figure 2B:
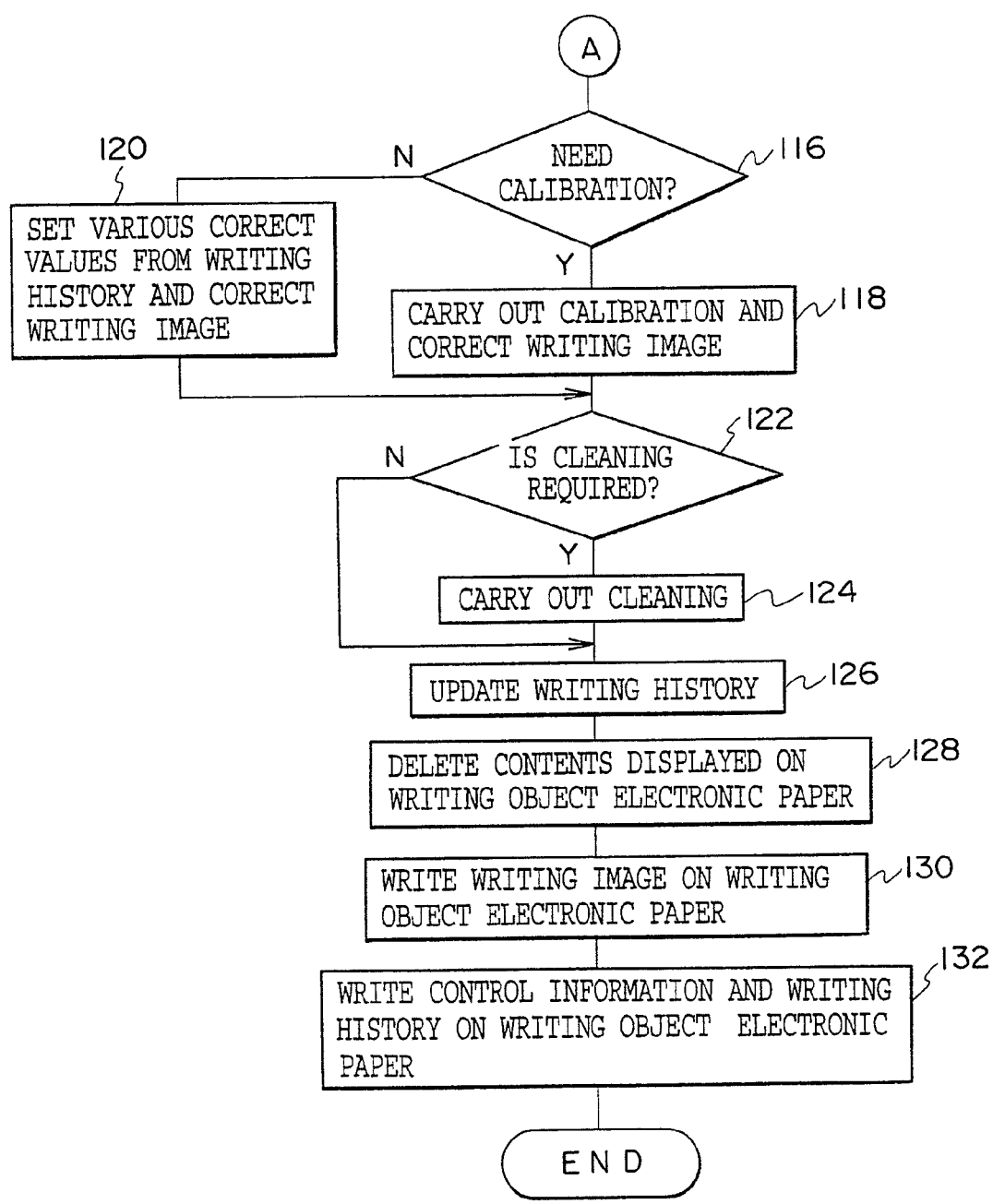

Next, with reference to flowcharts of FIGS. 2A and 2B, as an operation according to the first embodiment of the present invention, a document writing processing that is executed by the controlling section 22 of the electronic paper control device 10 will be explained. Further, the document writing processing is implemented such that a specified electronic paper 12 as the writing-object electronic paper 12 is inserted into the machine body of the electronic paper control device 10 by a user who desires to write a specified document on the specified electronic paper 12, and when a document which is to be written (writing-object document) on the writing-object electronic paper 12 is specified by the user via the I/F portion 32, a document writing program is executed by a CPU at the controlling section 22.

In step 100, document information that is specified as a writing-object document by a user is fetched from the document memory 20 and writing-conditions are determined in order to write a document that is indicated by the document information on the writing-object electronic paper 12. Further, the writing-conditions are formed by parameters comprising a size of a writing image (a scaling ratio of a writing document), a writing position on the electronic paper 12, a layout of the writing document within the writing image (for example, whether or not "N up" or the like is carried out to layout a plurality of pages of the writing documents within the writing image), a writing resolution and the like. The writing-conditions can be determined such that writing-object document information is analyzed, and a value for each of the aforementioned parameters is set by considering a size or the like of the writing-object electronic paper. Moreover, the writing-conditions can be specified by a user via the I/F portion 32.

In step 102, the reading section 26 is instructed to read control information from the writing-object electronic paper 12, and the control information is read by the reading section 26 from the writing-object electronic paper 12, whereby the control information outputted from the reading section 26 is fetched. In the next step 104, individual number for the writing-object electronic paper 12, which is contained in the fetched control information from the reading section 26, is extracted from the control information. In step 106, presuming that the fetched document information in step 100 is written on the writing-object electronic paper 12, the obtained individual number of the writing-object electronic paper 12 in step 104 and the fetched document information in step 100 are transmitted to the control server 40 of the control center 38, whereby the control center 38 is requested to register a document in the control DB 44.

Figure 3A:
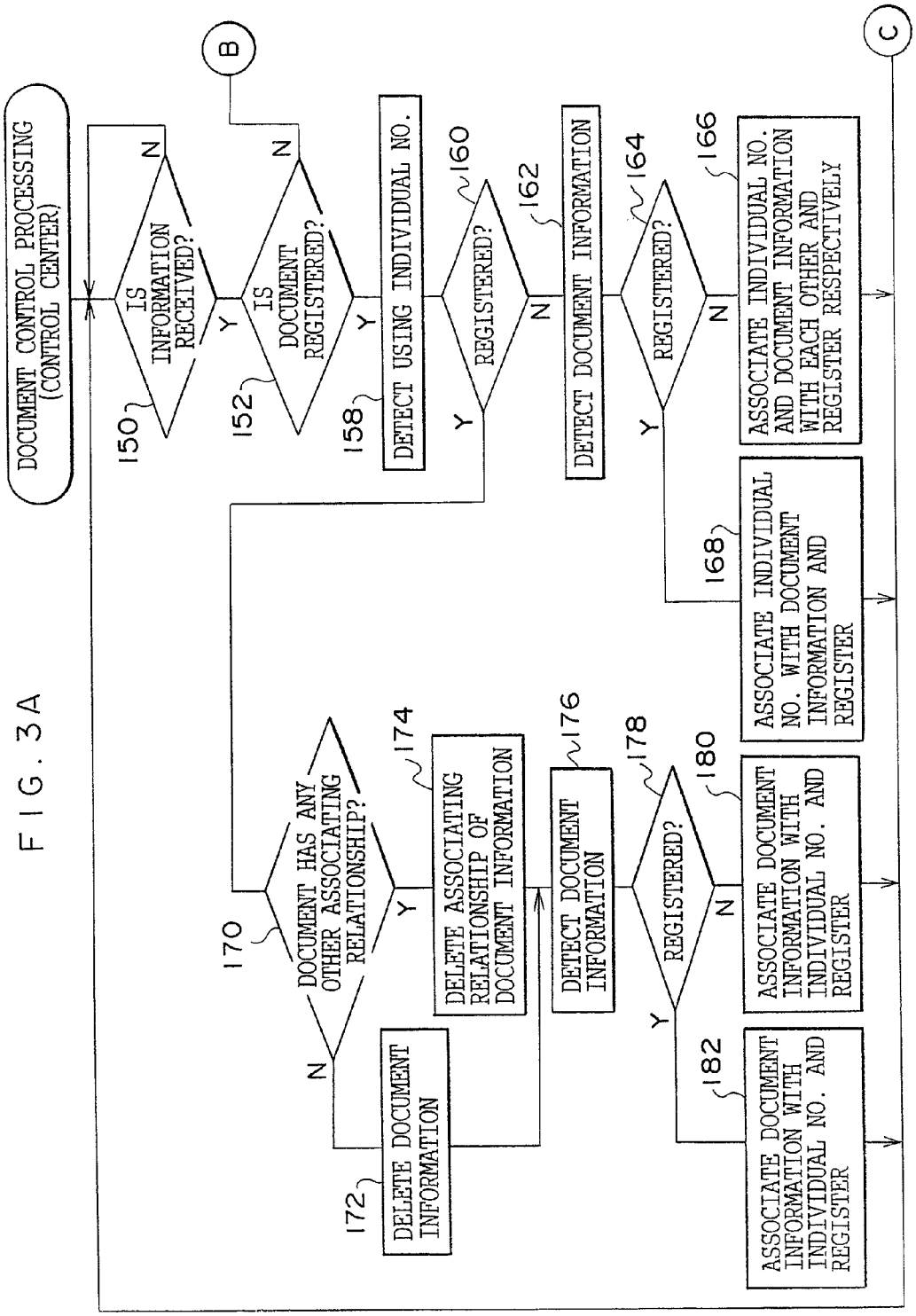

A document control processing which is shown in FIGS. 3A and 3B is executed at the control server 40 of the control center 38 all the time. During the document control processing, in step 150, it is determined whether or not any information is received from one electronic paper control device 10. The determination in step 150 is repeated until the determination is affirmed. When any information is received from the electronic paper control device 10, the determination in step 150 is affirmed, and the processing proceeds to step 152.

The control DB 44 which is stored in the storage medium 42 of the control center 38, as an example, as is shown in the following table 1, is structured such that areas for storing individual numbers and document control numbers are each provided for each electronic paper, and the other areas for storing a plurality of document information are each provided for each electronic paper.

TABLE 1

<An example of contents of control DB>

| Individual number of electronic paper | Document control number | Document information |
|---|---|---|
| 1 | control number of document A | document information of document A |
| 2 | control number of document B | document information of document B |
| 3 | control number of document C | document information of document C |
| 4 | control number of document A | . |
| 5 | control number of document B | . |

TABLE 1-continued

<An example of contents of control DB>

| Individual number of electronic paper | Document control number | Document information |
|---|---|---|
| . | . | |
| . | . | |

In table 1, the document control number is a number which is set by the control server 40 of the control center in order to identify each of document information stored in the control DB 44. In the control DB 44 which is shown in table 1, document control number that corresponds to a document that is written on each electronic paper 12 is associated with an individual number of each electronic paper 12, and registered.

The control server 40 according to the present embodiment is requested by the electronic paper control device 10 to update the control DB 44. In the present embodiment, the number of requests from the electronic paper control device 10 to the control server 40 is four, namely, registering a document, fetching the registered document, adding the registered document, and deleting the registered document. In steps 152 to 156, it is determined to which one of the four requests a request that is indicated by the received information from the electronic paper control device 20 corresponds.

As described above, if a request from the electronic paper control device 10 is to register a document, the determination in step 152 is affirmed, and the processing proceeds to step 158, and further processings from step 158 will be carried out. Namely, in step 158, the control DB 44 is detected by using the received individual number from the electronic paper control device 10 as a key. In the next step 160, it is determined whether or not an individual number with which the control DB 44 has been detected is registered in the control DB 44.

When the writing-object electronic paper 12 is an electronic paper or the like in which no document has been written thereon before or the like, since no individual number or the like is registered in the control DB 44, the determination in step 160 is negative, and the processing proceeds to step 162, where writing-object document information is detected by comparing the received writing-object document information from the electronic paper control device 10 with respective document information that are registered in the control DB 44. In the next step 164, it is determined whether or not the writing-object document information is already registered in the control DB 44.

If a writing-object document is a document, which is written only on the writing-object electronic paper 12 among the electronic papers 12 as a whole, the determination in step 164 is also negative. In this case, since neither the received individual number nor the received writing-object document information is registered in the control DB 44, in step 166, writing-object document information is newly registered in the control DB 44 and a document control number is newly set for this document information, and the received individual number is associated with the set document control number, and newly registered in the control DB 44, and the processing returns to step 150. Accordingly, an individual number is associated with the writing-object document information through the document control number.

When the writing-object document information is already registered in the control DB 44 (namely, when a writing-object document is a document which is written on one of the other electronic papers 12), the determination in step 164 is affirmed, and the processing proceeds to step 168, where the received individual number is associated with the document control number which has already been set based on the writing-object document information, and newly registered in the control DB 44, and the processing returns to step 150. Accordingly, multi-registering of the same document information in the control DB 44 can be prevented, whereby storage capacity of the storage medium 42 for storing the control DB 44 can be prevented from being unnecessarily loaded by storing an excessive amount of document information.

On the other hand, if the writing-object electronic paper 12 is an electronic paper on which a document has been written before, the determination in step 160 is affirmed, and the processing proceeds to step 170, where a document control number, which is associated with the received individual number (the individual number of the writing-object electronic paper 12), and registered in the control DB 44, is read to detect whether or not any other individual number do exists which is associated with the same document control number, and registered in the control DB 44.

When the determination in step 170 is denied, since the document which has been written on the writing-object electronic paper 12 is not written in other documents, the processing proceeds to step 172, where the document information for which the document control number which has been read previously was set is deleted from the control DB 44, and then the processing proceeds to step 176. If the determination in step 170 is affirmed, since the document which has been written on the writing-object electronic paper 12 is also written on other electronic papers 12 with the obtained individual numbers, the processing proceeds to step 174, where deletion of document information from the control DB 44 is not carried out but only deletion of the document control number which is associated with the received individual number and registered in the control DB 44 is carried out. Accordingly, only deletion of a relationship between the received individual number and the document information which have been associated therewith is carried out, and the processing proceeds to step 176.

In the next step 176, the writing-object information is detected by comparing the received writing-object document information with each of the document information that are registered in the control DB 44. In the next step 178, it is determined whether or not the writing-object document information is already registered in the control DB 44. If the determination in step 178 is negative, the received individual number is registered in the control DB 44. However, since no writing-object document information is registered in the control DB 44, in step 180, writing-object document information is newly registered in the control DB 44, a document control number is set to the document information, the set document control number is associated with an individual number which has already been registered, and registered in the control DB 44. Thereafter, the processing returns to step 150.

If the determination in step 178 is affirmed, since both the received individual number and the writing-object document information are registered in the control DB 44, the processing proceeds to step 182, where the document control number which is set for the obtained document information thus detected in step 176 is associated with the obtained individual number thus detected in step 158 and registered in the control DB 44. Thereafter, the processing returns to step 150. By the above-described processing, the received individual number from the electronic paper control device 10 and the writing-object document information are associated with each other at the control DB 44.

On the other hand, in the electronic paper control device 10, when the control center 38 is requested to register a document in the control DB 44 in step 106 during the document writing processing (FIGS. 2A and 2B), in the next step 108, the writing-object document information is converted to bitmap data in accordance with the writing-conditions determined in step 100, and a writing image for writing a writing-object document on the writing-object electronic paper is formed.

Figure 4A:
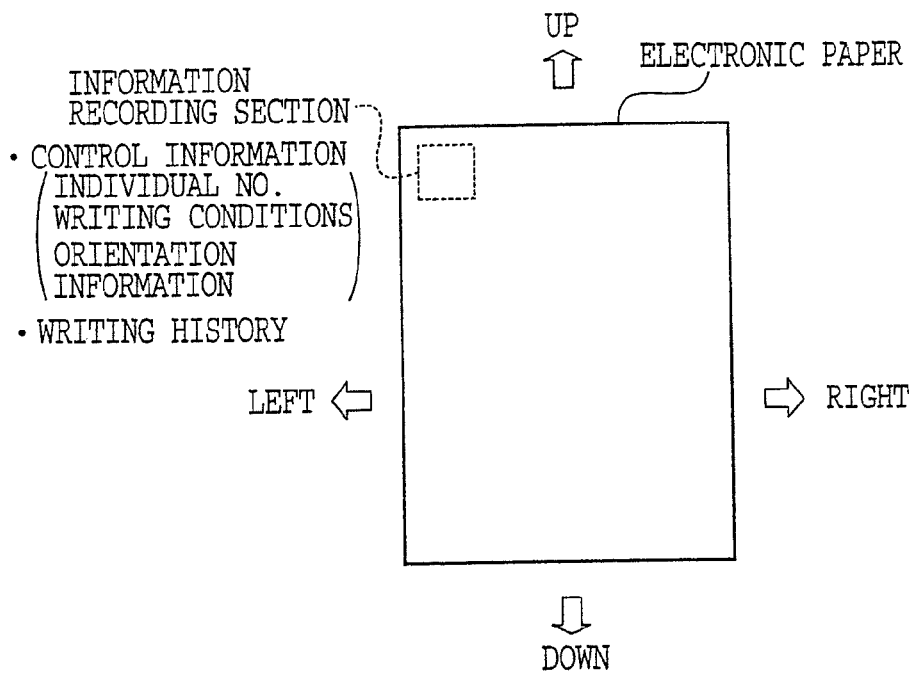
FIGS. 4A and 4B are image diagrams for explaining a method of detecting orientation of electronic paper.

In the next step 110, orientation of the writing-object electronic paper 12 is detected. The electronic paper 12 according to the present embodiment is structured such that the orientation of the electronic paper 12 is easily detectable. Namely, as described above, control information or attribute information such as writing history information is optically recorded on the electronic paper 12 or recorded on the IC chip which is mounted on the electronic paper 12. However, if attribute information is optically recorded (as characters or barcodes) on the electronic paper 12, for example, as is shown in FIG. 4A, which shows an information recording section, the attribute information is recorded at a position which is offset from the center of the electronic paper 12 (in the vicinity of a particular corner which corresponds to a portion out of a document writing region on the electronic paper 12).

If attribute information is recorded on the electronic paper 12 as described above, when the reading section 26 reads control information from the writing-object electronic paper 12, a position is searched at which attribute information (control information) is recorded on the writing-object electronic paper 12. Therefore, the reading section 26 which has read control information from the writing-object electronic paper 12 in step 110 is asked for a recording position of the attribute information (control information) on the writing-object electronic paper 12. Based on the recording position of the attribute information (control information) on the writing-object electronic paper 12 provided by the reading section 26, orientation of the writing-object electronic paper 12 can be detected.

Figure 4B:
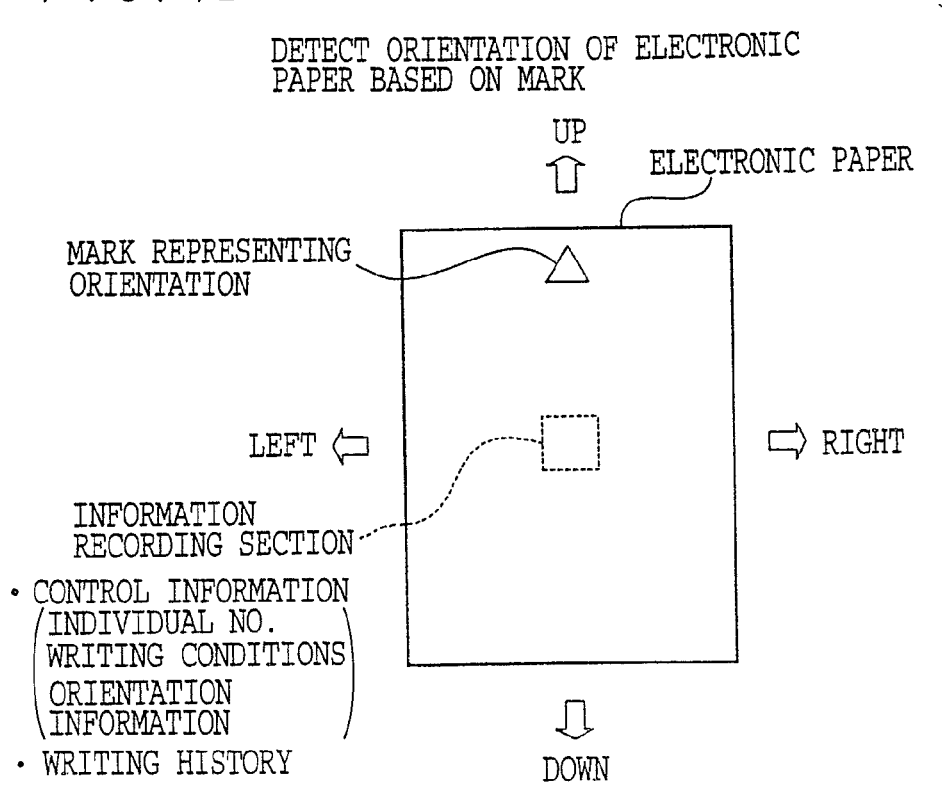

If attribute information is recorded on the IC chip which is mounted on the electronic paper 12, for example, as shown in FIG. 4B, detection of the orientation of the electronic paper 12 is facilitated by previously recording a mark indicating orientation of the electronic paper 12 (denoted by "orientation indication mark" in FIG. 4B) at the position which is offset from the center of the electronic paper 12 (position that corresponds to a region out of the document writing region on the electronic paper 12). In this case, based on a recording position of a mark on the writing-object electronic paper 12, the orientation of the writing-object electronic paper 12 can be detected.

In step 112, orientation information indicating orientation of a writing-object document is set based on orientation of the writing-object electronic paper 12 which is detected in step 110. An individual number of the writing-object electronic paper 12 and writing-condition information indicating the writing-conditions that are determined in step 110 are added to the set orientation information. Accordingly, control information to be written on the writing-object electronic paper 12 is created. Further, in step 114, the reading section 26 is instructed to read writing history information from the writing-object electronic paper 12, and the read writing history information read from the writing-object electronic paper 12 is fetched from the reading section 26.

In the present embodiment, calibration for correcting a writing image in order to suppress fluctuations of the finish of a document, which is written on the electronic paper 12, is carried out. The calibration is carried out by using calibration data that is determined in accordance with characteristics of the electronic paper 12. However, the electronic paper 12 has characteristics which, when a document (image) is repeatedly written thereon, varies in accordance of the number of times of the writing thus causing a problem in that calibration accuracy deteriorates in accordance with variation of the characteristics of the electronic paper 12.

For this reason, the writing history information that is fetched in step 114 includes the number of accumulated writing times which corresponds to an accumulated value of the number of times of writing a document since the manufacture of the writing-object electronic paper 12 has been completed (the number of the accumulated writing times is initially set to "0" during the manufacture of the electronic paper 12, and is updated each time a document is written on the electronic paper 12). In the next step 116, it is determined whether or not calibration data must be updated based on the number of the accumulated writing times that is contained in the writing history information that is read from the writing-object electronic paper 12.

In the present embodiment, in order to reduce variation of finish of the written document on the electronic paper 12 in accordance with variation of characteristics of the writing-object electronic paper 12, the determination in step 116 is affirmed each time a document is written on the electronic paper 12 at a predetermined time, and the processing proceeds to step 118, where calibration data is newly determined, and the newly determined calibration data is used to carry out a calibration processing for correcting a writing image.

Figure 5A:
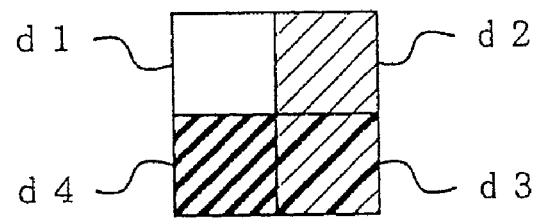
FIGS. 5A and 5B are image diagrams each illustrating an example of a test pattern.
Figure 5B:
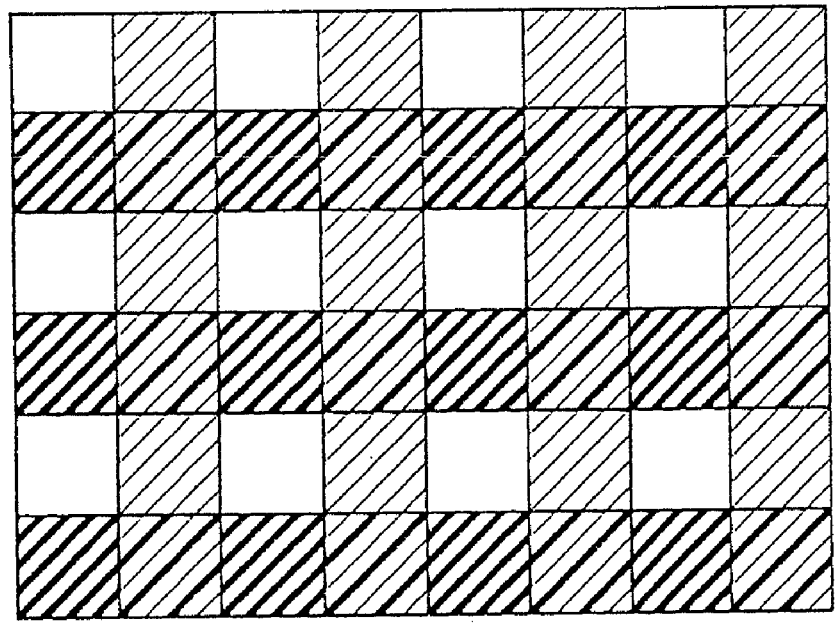

More specifically, for example, a test pattern image comprising unit patterns each of which is formed by a plurality of patches having the same color (for example, gray) and having different densities (four patches whose densities are d1, d2, d3, and d4) (see FIG. 5A) are substantially uniformly distributed over the entire surface of a region of the electronic paper 12 within which a document is written (see FIG. 5B) is written on the writing-object electronic paper 12 by the recording section 24. Then, the test pattern image that is recorded on the writing-object electronic paper 12 is read by the reading section 26. Further, in accordance with characteristics owned by the electronic paper 12 which is to be read ("reading-object electronic paper 12), there is a possibility that the test pattern image which is recorded on a reading-object electronic paper 12 may be affected by the characteristics owned by the reading-object electronic paper 12. Consequently, the finish of a written document varies such that a recording position of the test pattern image is displaced from a predetermined recording position or a gray scale of the test pattern image becomes partially uneven or the like.

For this reason, based on image data obtained by the reading portion 26 reading the test pattern image, the image data is analyzed to compute a physical amount indicating the finish of the test pattern image recorded on the writing-object electronic paper 12 (for example, a position where image (respective patches) is recorded and a partial variation of the gray scale (density of respective patches)) is computed. The computed value of the physical amount is compared with a value of the physical amount when the test pattern image had a desired finish. Accordingly, calibration data is determined in order to obtain a desired finish when the test pattern image or other document (image) is recorded on the writing-object electronic paper 12.

In step 118, based on paper calibration data which is determined due to the above-described processing, when a writing-object document is written on the writing-object electronic paper 12, a writing image is corrected such that the writing-object document on the writing-object electronic paper 12 has a desired finish. Further, calibration data can be recorded on the electronic paper 12 as a writing history information (when calibration data is newly determined, the previous calibration data contained in the writing history information is overwritten by new calibration data), for example. However, instead of this, calibration data can be registered in the control DB 44 of the control center 38.

On the other hand, in step 116, if it is determined that update of calibration data is not required, In step 120, calibration data is obtained from writing history information (if calibration data is registered in the control DB 44 of the control center 38, calibration data is obtained from the control center 38), when the writing-object document is written on the writing-object writing paper 12, a writing image is corrected based on the calibration data such that the writing-object document on the writing-object electronic paper 12 has a desired finish. The calibration in step 118 or step 120 can suppress variation of the finish of the writing-object document written on the writing-object electronic paper 12.

In the next step 122, it is determined whether or not the writing-object electronic paper 12 requires cleaning (cleaning of the surface of the writing-object electronic paper 12). In the present embodiment, the electronic paper 12 is determined to require cleaning if an accumulated value of the number of times of writing a document has amounted to a predetermined value since the last time cleaning was carried out, or in a state in which the writing-object electronic paper 12 is filled out by hand and if a document which is not related to contents with which the electronic paper 12 has been filled out by hand is written on the writing-object electronic paper 12. The aforementioned determination is negative, the processing proceeds to step 126 without carrying out any processing. However, if the determination in step 122 is affirmed, the processing proceeds to step 124, where the surface of the writing-object electronic paper 12 is cleaned by the cleaning section 28.

In step 126, among the read writing history information from the writing-object electronic paper 12 in step 114, the accumulated number of times of writing a document is updated. Namely, if no processing for newly determining calibration data is carried out, in order to write a writing-object document on a writing-object electronic paper 12, the accumulated number of times of writing a document is increased by 1, and if calibration is also determined, since a test pattern image is written on the writing-object electronic paper 12, the accumulated number of times of writing a document is incremented by 2.

In step 128, the document (image) which is currently written on the writing-object electronic paper 12 is deleted by the recording section 24. In the next step 130, the writing image which has experienced calibration is used to write the writing-object document on the writing-object electronic paper 12 by the recording portion 24. Further, in step 132, both the control information that is prepared in step 112 and the writing history information that is updated in step 126 are written by recording section 24 on the writing-object electronic paper 12. Consequently, the document writing processing is completed.

The electronic paper 12 according to the present embodiment can be used as a medium that replaces paper. Namely, even after a writing-object document is written on the electronic paper 12 as described above, characters and the like can be added thereon by hand in the same manner as in paper or the like. Further, in the first embodiment of the present invention, a pen (for handwriting) is prepared in use for filling out (adding) the electronic paper 12 by hand such that a user fills out (adds) the electronic paper 12 by hand by using the pen for hand.

The pen for handwriting is structured so as to fill out the electronic paper 12 therewith by being deposited with ink. Ink for the pen for handwriting has a spectral reflectance characteristics that is shown by a dashed line in FIG. 7 as an example. Namely, the electronic paper 12 according to the present embodiment has optical characteristics such that a light reflectance of a portion of the electronic paper 12 on which a document is written (portion at which the density varies by writing a document such as a portion corresponding to characters, of a document which is consisted of characters (hereinafter, "imaging portion")) has a light reflectance that is different from that of a portion of the electronic paper 12 which is extended to a predetermined wavelength region including at least a visible region and at which no document is written (portion at which density is not changed in spite of a document writing, for example, a portion not including characters in the document which is consisted of characters (portion which corresponds to a background portion) (hereinafter, "non-imaging portion"). However, ink for the pen for handwriting has optical characteristics such that a light reflectance within at least a predetermined wavelength region is different from that of each of an imaging portion and a non-imaging portion of the electronic paper 12.

Figure 6A:
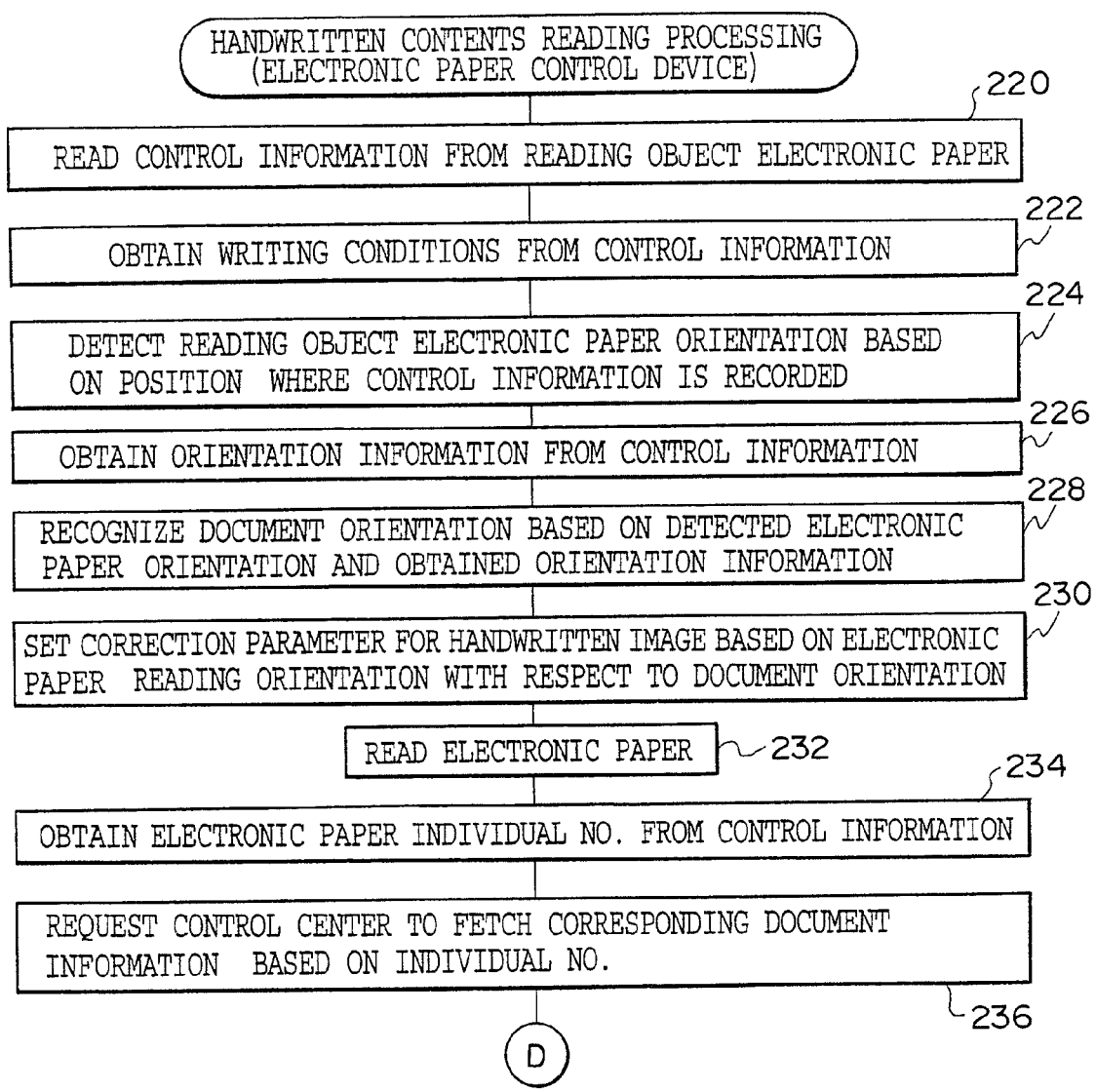
FIGS. 6A and 6B are flowcharts each illustrating contents of a written contents reading processing according to a first embodiment of the present invention.
Figure 6B:
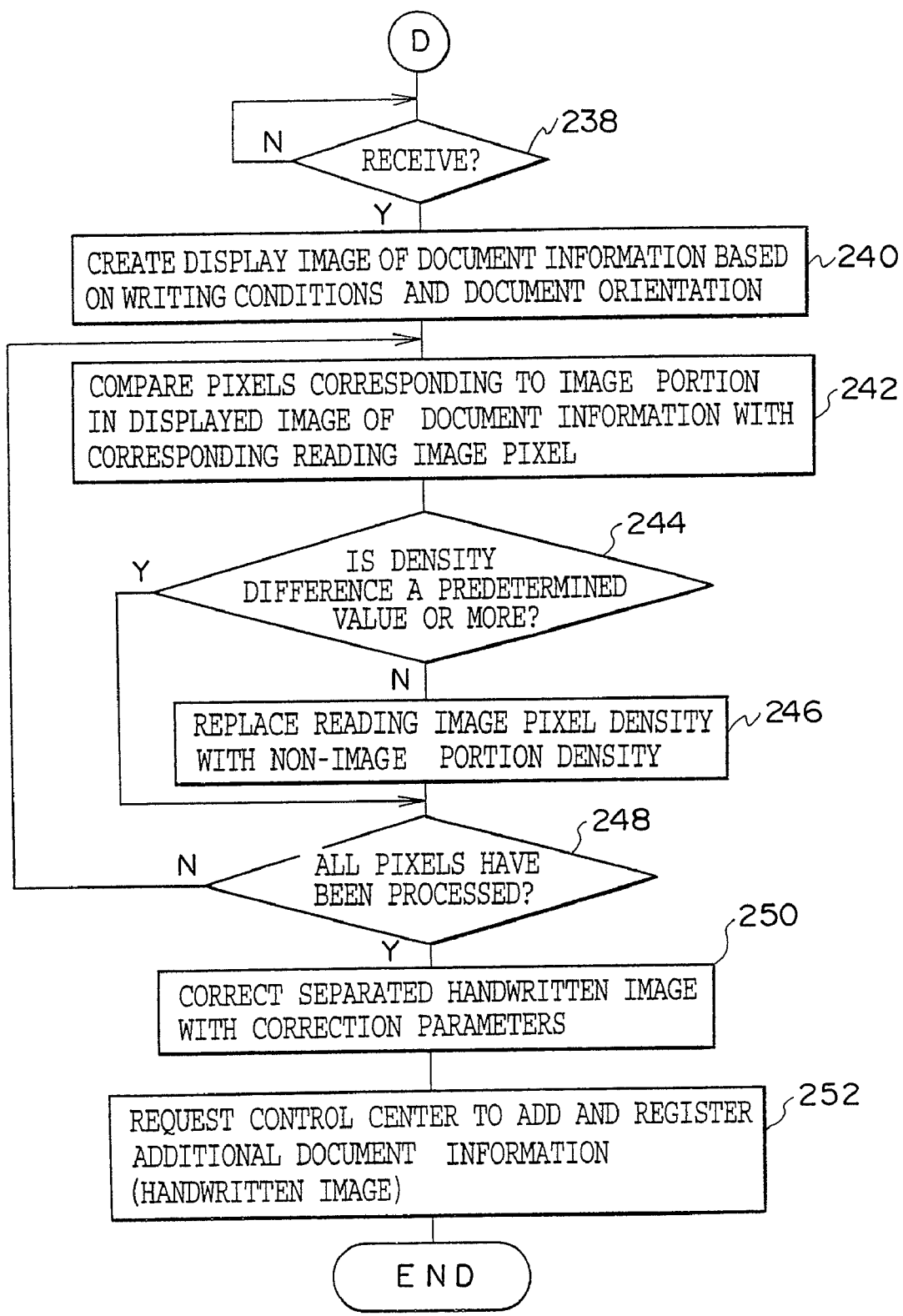

If a user who filled out the electronic paper 12, on which a predetermined document has already been written, by hand with the pen for handwriting, desires to digitize contents with which the electronic paper 12 was filled out by hand, the electronic paper 12 which was filled out by hand with the pen for handwriting is inserted into a machine body of the electronic paper control device 10 by the user. The inserted electronic paper 12 is instructed to read the contents with which the electronic paper 12 was filled out by hand. Accordingly, a handwritten contents reading program is executed by a CPU of the controlling section 22, and a handwritten contents reading processing which is shown in FIGS. 6A and 6B is carried out by the controlling section 22.

During the handwritten contents reading processing, first, in step 220, the reading section 26 is instructed to read control information from the electronic paper 12 (the reading-object electronic paper 12) which is inserted into the machine body of the electronic paper control device 10. Control information is read from the reading-object electronic paper 12. Then, the outputted control information from the reading section 26 is fetched. Further, in step 222, writing-condition information that is contained in the control information fetched from the reading section 26 is obtained from the control information.

In step 224, orientation of the reading-object electronic paper 12 can be detected such that, if attribute information including control information is optically recorded at a position which is offset from the center of the electronic paper 12, the reading section 26 is inquired of a recording position of attribute information (control information) on the reading-object electronic paper 12. Accordingly, orientation of the reading-object electronic paper 12 can be detected based on the recording position of attribute information (control information) on the reading-object electronic paper 12 that is informed from the reading section 26. Further, if the orientation indicating mark (see FIG. 4B) is previously recorded at a position which is offset from the center of the electronic paper 12, orientation of the reading-object electronic paper 12 can be detected based on the recording position of the mark on the reading-object electronic paper 12.

In step 226, orientation information that indicates orientation of the written document is obtained based on the orientation of the electronic paper 12, from the reading control information from the reading-object electronic paper 12 in step 220. Further, in step 228, based on the detected orientation of the reading-object electronic paper 12 in step 224 and the obtained orientation information in step 226, orientation of the written document on the reading-object electronic paper 12 is recognized. Then, in step 230, based on a relationship between the recognized orientation of the document in step 228 and a reading direction in which the reading-object electronic paper 12 is read by the reading section 26, parameters are defined to apply a correction processing to image data that represents contents with which the electronic paper 12 is filled out by hand (handwritten image that corresponds to second image data according to the present invention).

In the first embodiment of the present invention, the aforementioned handwritten image is separated and extracted from the image data (the read image) resulting from reading the reading-object electronic paper 12 by the reading section 26 (a detailed description thereof will be given later). However, in the present embodiment, the handwritten image which was separated and extracted from the image data is subjected to correction processing including a rotation processing, a page dividing processing and a scaling processing, such that a written image for writing a composite image in which a document and the handwritten contents are overlapped with each other on the electronic paper 12 is generated simply by overlapping the separated and extracted handwritten image with a writing image of the document which is written on the reading-object electronic paper 12. In addition, the above-described steps 224 to 230 correspond to a detection component of the present invention.

In step 230, based on the orientation of the written document and the reading direction by the reading section 26, parameters during the rotation processing (for example, a rotational direction or a rotational amount) are defined, and if a plurality of pages of documents is written on the reading-object electronic paper 12 (for example, N up or the like), parameters during the page dividing processing (for example, the number of divisions or a divisional boundary position) are defined, and parameters during the scaling processing (for example, a scaling ratio) are also defined. Further, besides the aforementioned correction processing, the handwritten image is also subjected to a well known correction processing (such as an isolated point removal processing for removing points which are isolated within an image and which have a high possibility of being dust or the like or a narrow line processing in which narrow lines are thickened and then thinner to prevent narrow lines from being broken or blurred, or the like) by using an optical character reader (OCR). However, in step 230, parameters for such processings are also defined.

Figure 7A:
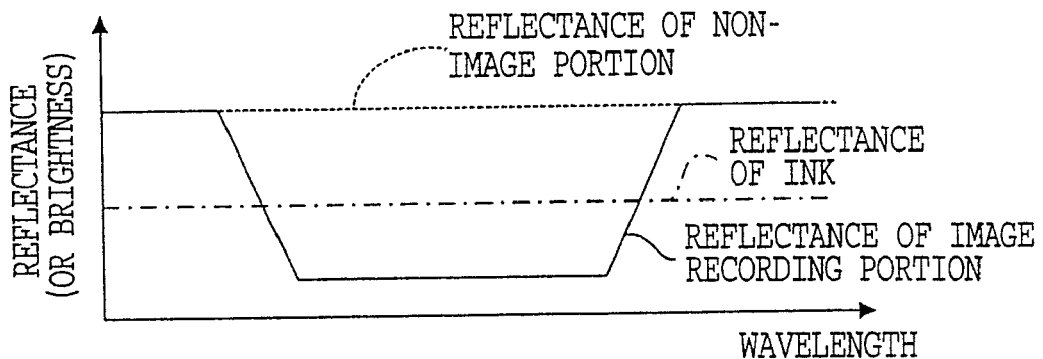
FIG. 7A is a diagram illustrating an example of spectral reflectance characteristics of an image portion/a non-image portion of electronic paper and ink.

After definition of parameters for the correction processing has been completed, in the next step 232, the reading-object electronic paper 12 is read by the reading section 26. Further, as shown in FIG. 7A by denoting as "CH1", the reading section 26 according to the first embodiment of the present invention reads the reading-object electronic paper 12 by using a sensor having spectral sensitivity characteristics that is sensitive only to the first wavelength region within which a light reflectance of the imaging portion and that of the non-imaging portion of the electronic paper 12, and that of ink for the hand pen are different from one another. Further, step 232 and the reading section 26 for actually reading the electronic paper 12 correspond to a reading component of the present invention. In further steps from the next step 234, a processing is carried out in which the handwritten image (image data representing the handwritten contents) is separated from the read image resulting from reading by the reading section 26.

Namely, in step 234, individual number of the reading-object electronic paper 12 is obtained from the control information read from the reading-object electronic paper 12 in step 220. The individual number of the reading-object electronic paper 12 which is contained in the control information corresponds to identification information of the present information. Further, in step 236, the obtained individual number of the reading-object electronic paper 12 in step 234 is transmitted to the control server of the control center 38, and the control center 38 is requested to fetch the document information that is associated with the individual number and registered in the control DB 44 (document information of the document which is written on the reading-object electronic paper 12). In step 238, it is determined whether or not the document information is received from the control center 38, and the processing waits until the determination is affirmed. Moreover, steps 232 to 238 correspond to a recognition component of the present invention.

When the control server 40 of the control center 38 is requested to fetch the document information from the electronic paper control device 10, the determination in step 150 during the document control processing (FIGS. 3A and 3B) is affirmed, and the determinations in steps 152 and 154 are negative, and the determination in step 156 is affirmed, and the processing proceeds to step 184, where the control DB 44 is detected with the received individual number from the electronic paper control device 10 as a key. Then, in the next step 186, it is determined whether or not the detected individual number is registered in the control DB 44.

If the determination in step 186 is negative, the processing proceeds to step 190, and returns an error response to the electronic paper control device 10 as a sender of individual information. However, if the determination in step 186 is affirmed, the processing proceeds to step 188, where the document information that is associated with the obtained individual number by the detection and registered in the control DB 44 is read from the control DB 44, and the read document information is transmitted to the electronic paper control device 10 as the sender of the individual information. Thereafter, the processing returns to step 150.

At the electronic paper control device 10 side, when the document information is received from the control server 40, the determination in step 238 during the handwritten contents reading processing (see FIGS. 6A and 6B) is affirmed, the processing proceeds to step 240. In step 240, based on the writing-conditions indicated by the obtained writing-condition information from the control information in step 222 and the recognized orientation of a document in step 228, the received document information from the control server 40 is converted to bitmap data to form a display image of document information which represents a state in which the document represented by the document information is displayed on the read image resulting from reading the electronic paper 12 in the previous step 232.

In step 242, data for simple image pixel that corresponds to the imaging portion of the electronic paper 12 is fetched from the display image of the document information that is formed in step 240, and corresponding image pixel data is fetched from the read image as data for image pixels which are supposed to receive a processing. The densities of pixels that are expressed by both pixel data thus fetched are compared to each other. In the next step 244, it is determined whether or not a density difference between the both fetched pixel is a predetermined value or more.

Figure 7B:
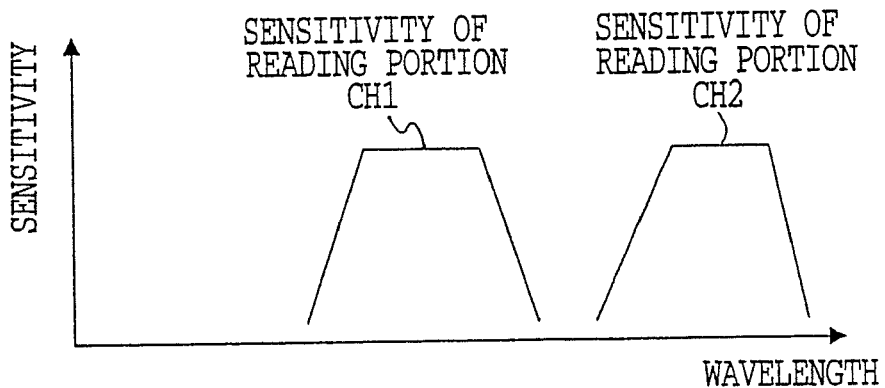
FIG. 7B is a diagram illustrating an example of spectral sensitivity characteristics of a reading section of electronic paper.

As shown in FIG. 7B by denoting as "CH1", since the reading section 26 according to the first embodiment of the present invention reads the electronic paper 12 within the first wavelength region within which the light reflectance of the imaging portion and that of the non-imaging portion, of the electronic paper 12, and that of ink for the handwriting pen are different from one another, if a density difference between image pixels which pixels are subjected to a processing on the read image and corresponding pixel density on the display image of the document information is less than a predetermined value, the image pixels which are subjected to a processing on the read image can be determined to be those corresponding to a portion which is not deposited with ink for the handwriting pen. For this reason, if the determination in step 244 is negative, the processing proceeds to step 246, where a value of the density of the image pixels which are subjected to a processing on the read image is converted to that corresponding to the non-imaging portion. Thereafter, the processing proceeds to step 248.

On the other hand, when a difference between a density of the image pixels which are subjected to a processing on the read image and that of the corresponding pixels on the display image of the document information is a predetermined value or more, the image pixels which are subjected to a processing on the read image are image pixels that correspond to portions of the electronic paper which is filled out by hand (portions that are deposited with ink for the handwriting pen). When the density of the image pixels is converted to a density value that corresponds to the non-imaging portion as described above, it can be determined that the contents with which the electronic paper 12 is filled out by hand by the user are deleted from the read image. Accordingly, if the determination in step 244 is affirmed, no processing is carried out, and the processing proceeds to step 248.

In step 248, it is determined whether or not the all of the image pixels that correspond to the imaging portion of the display image of the document information have received further processings from step 242. If the determination is negative, the processing returns to step 242, and then, steps 242 to 248 are repeated until the determination in step 248 is affirmed. Accordingly, among the read images resulting from reading the reading-object electronic paper 12, portions which correspond to the imaging portion and which are not deposited with ink for the handwriting pen are deleted, and accordingly, the handwritten image (bitmap image data that represents contents with which an electronic paper is filled out by hand) is separated and extracted from the read image.

The above-described steps 240 to 248 correspond to an extracting component of the present invention, and the display image of the document information which is formed in step 240 corresponds to the result from "estimating a first image due to the reading by the reading component" of the present invention.

Figure 8:
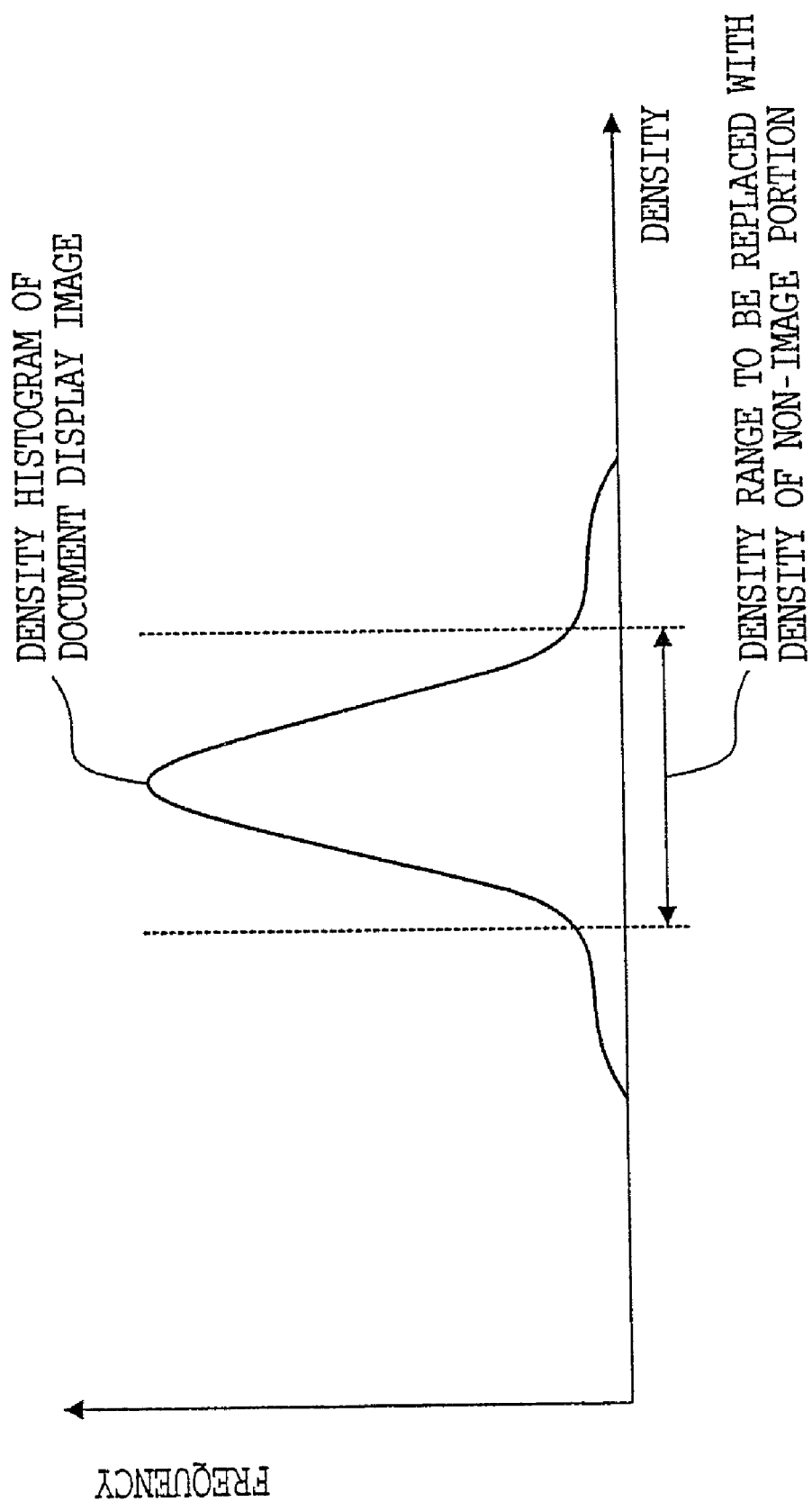
FIG. 8 is a diagram illustrating an example of a histogram of a display image of a document.

Separation and extracting of the handwritten image from the read image is not limited to those due to the comparison between the density on the read image and that of the document information on the display image. For instance, if the written document on the electronic paper 12 is a binary image as in the document which is consisted of characters, as is shown as an example in FIG. 8, the handwritten image can be separated and extracted such that a density histogram of the display image of the document information is created. A density range, from which portions corresponding to a bottom portion of the density histogram have been deleted, is defined.

Among respective image pixels of a reading image, only image pixels having a density within a range of the defined density are converted to a density of the non-image portion.

Further, if a positional accuracy of the reading-object electronic paper 12 (more specifically, a positional accuracy of the reading-object electronic paper 12 in reference to the reading section 26) is insufficient, the read image and the display image of document information are each divided into strip-shaped blocks in a vertical direction, and also divided into strip-shaped blocks in a transverse direction. Among edge portions within the image, an edge portion whose distance to an end portion of a block is the shortest (a vertical distance for a block divided in a vertical direction and a transverse distance for a block divided in a transverse direction) is obtained for each block. A distance between the obtained edge portion and the end portion of the block is compared with each corresponding block pair. A distance difference of a block pair whose distance difference is small (a block pair that is estimated to have been scarcely affected by contents with which the electronic paper 12 is filled out by hand) can be used as a displacement amount of a position in a vertical/transverse direction (a mean or intermediate value of distance differences of block pairs can also be used) to determine corresponding image pixels between the read image and the display image of document information.

If the determination in step 248 is affirmed, the processing proceeds to step 250, where a correction processing (comprising a rotational processing, a page dividing processing, a scaling processing, an isolated point removal processing, and a narrow line processing) of the handwritten image which is separated and extracted from the read image is performed in accordance with the parameters defined in the previous step 230. Further, step 250 (particularly a rotational processing out of various correction processings that are carried out in step 250) constitutes a control component of the present invention. Then, in step 252, the handwritten image which has experienced the correction processing, and the obtained individual number of the reading-object electronic paper 12 in step 234 are transmitted to the control server 40 of the control center 38. The control center 38 is requested to add and register the handwritten image into the control DB 44. The handwritten contents reading processing is completed.

When the control server 40 of the control center 38 is requested by the electronic paper control device 10 to add and register the handwritten image thereinto, the determination in step 150 during the document control processing (FIGS. 3A and 3B) is affirmed, and the determination in step 152 is negative, while the determination in step 154 is affirmed. The processing proceeds to step 192, where the control DB 44 is detected by using the received individual number from the electronic paper control device 10 as a key. In the next step 194, it is determined whether or not the detected individual number is registered in the control DB 44.

If the determination in step 194 is negative, the processing proceeds to step 190, where an error response is returned to the electronic paper control device 10 as an original information sender. However, the determination in step 194 is affirmed, the processing proceeds to step 196, where document information which is associated with the obtained individual number and is registered in the control DB 44 is read from the control DB 44, and the received handwritten image from the electronic paper control device 10 is added to the read document information. Accordingly, document information that indicates the written document on corresponding electronic paper 12 and contents with which the electronic paper 12 is filled out by hand is newly created. Then, in the next step 198, the newly created document information is associated with the obtained individual number thus detected, and registered in the control DB 44, and the processing returns to step 150.

Then, if the control center 38 is requested by the electronic paper control device 10 to fetch document information, document information to which the handwritten image has been added is read from the control DB 44, and transmitted to the electronic paper control device 10. Accordingly, the electronic paper control device 10 which has received the document information can easily write a composite image of contents with which the electronic paper 12 is filled out by hand and which are represented by the handwritten image, and the document indicated by the document information, on the electronic paper 12 from which the contents have been deleted. Consequently, the control center 38 (the control server 40 and the storage medium 42) corresponds to the control component of the present invention.

If the electronic paper control device 10 deletes a document which is written on the electronic paper 12 (or image in which the contents, with which the electronic paper 12 is filled out by hand and which are represented by the handwritten image, are synthesized with the document), an individual number of the electronic paper 12 from which a document or the like is deleted is transmitted from the electronic paper control device 10 to the control server 40 of the control center 38, and the control center 38 is requested to delete corresponding document information registered in the control DB 44.

In this case, the determination in step 150 during the document control processing (FIGS. 3A and 3B) is affirmed, and the determinations in steps 152 to 156 are affirmed, and the processing proceeds to step 200, where the control DB 44 is detected by using the received individual number from the electronic paper control device 10 as a key. In the next step 202, it is determined whether or not the individual number with which the control DB 44 is detected is registered in the control DB 44. Then, if the determination is negative, the processing proceeds to step 204, where an error response is returned to the electronic paper control device 10 as the original information sender. However, the determination in step 202 is affirmed, the processing proceeds to step 206, where a document delete processing (the same processing as described in steps 170 to 174) is carried out.

Therefore, information that is associated with the individual number of each electronic paper 12 and registered in the control DB 44 of the control center 38 is appropriately updated so as to always correspond to the written contents on each electronic paper 12.

In the above-description, a description of an example has been made in which an electronic paper is filled out by hand by using a pen for handwriting having the structure in which the electronic paper is deposited with ink having the spectral reflectance characteristics as shown by a dashed line in FIG. 7A. However, in the handwritten contents reading processing according to the first embodiment of the present invention, if a density of a portion of the electronic paper which is filled out by hand and that of an imaging portion of the electronic paper are different from each other, the handwritten image can be separated and extracted from the read image. Accordingly, when the electronic paper 12 is filled out by hand, any writing tool can be used as long as it satisfies the above-described conditions.

Second Embodiment

Next, a second embodiment of the present invention will be described. Further, since the second embodiment of the present invention is structured in the same manner as the first embodiment of the present invention, portions identical to those shown in the first embodiment are denoted by the same reference numerals and a description thereof will be omitted. Hereinafter, with reference to flowcharts of FIGS. 9A and 9B, a handwritten contents reading processing according to the second embodiment of the present invention will be explained, as an operation of the second embodiment of the present invention, In step 270, the reading section 26 is instructed to read control information from the reading-object electronic paper 12, control information is read from the reading-object electronic paper 12, and the outputted control information from the reading section 26 is fetched. Further, in step 272, an individual number of the reading-object electronic paper 12, which is contained in the reading control information from the reading-object electronic paper 12, is obtained from the control information. In step 274, the obtained individual number of the reading-object electronic paper 12 in step 272 is transmitted to the control server 40 of the control center 38, and the control center 38 is requested to fetch document information which is associated with the individual number and registered in the control DB 44 (document information of a document which is written on the reading-object electronic paper 12). In step 276, it is determined whether or not document information is received from the control center 38, and the processing waits until the determination is affirmed.

When document information is received from the control sever 40 of the control center 38, the determination in step 276 is affirmed, and the processing proceeds to step 278, where writing-condition information that is contained in the reading control information from the reading-object electronic paper 12 is obtained from the control information. In the next step 280, orientation of the reading-object electronic paper 12 is detected in the same manner as in step 224 during the handwritten contents reading processing (FIGS. 6A and 6B) according to the first embodiment of the present invention. Further, in step 282, orientation information, which indicates orientation of a document to be written when the orientation of the electronic paper 12 is referenced, is obtained from the reading control information from the reading-object electronic paper 12. In the next step 284, based on the detected orientation of the reading-object electronic paper in step 280 and the obtained orientation information in step 282, orientation of the written document on the reading-object electronic paper 12 is recognized.

In step 286, the reading section 26 is instructed to read writing history information from the reading-object electronic paper 12, and the read writing history information from the reading-object electronic paper 12 by the reading section 26 is fetched. Further, in step 288, based on a relationship between the recognized orientation of document in step 284 and a direction in which the reading section 26 reads the reading-object electronic paper 12, in the same manner as in step 230 during the handwritten contents reading processing according to the first embodiment of the present invention (FIGS. 6A and 6B), parameters for the correction processing that are defined for image data (handwritten image) representing contents with which an electronic paper is filled out by hand.

In step 290, a document which is written on the reading-object electronic paper 12 is deleted by the recording section 24. Further, step 290 corresponds to a delete control component of the present invention. Further, in step 292, the reading-object electronic paper 12 is read by the reading section 26. Step 292 and the reading section 26 which actually reads the reading-object electronic paper 12 correspond to a reading component of the present invention.

At this point, in the present embodiment, since a document which is written on the reading-object electronic paper 12 has been deleted therefrom, the reading-object electronic paper 12 is in a state of indicating only contents with which the reading-object electronic paper 12 is filled out by hand. Accordingly, such a complicated processing as in the handwritten contents reading processing of the first embodiment of the present invention (see FIGS. 6A and 6B) is not required, and instead, by simply reading the reading-object electronic paper 12 in step 292, the handwritten image, which represents contents with which the reading-object electronic paper 12 is filled out by hand, can be obtained.

In step 294, various correction processings are conducted on the handwritten image that is obtained by the reading in step 292 by using the parameters defined in the previous step 288 in the same manner as in step 250 during the handwritten contents reading processing (FIGS. 6A and 6B) according to the first embodiment of the present invention. In step 296, the handwritten image which has experienced the correction processings, and the obtained individual number of the reading-object electronic paper 12 in step 272 are transmitted to the control server 40 of the control center 38, and the control center 38 is requested to add and register the handwritten image into the control DB 44. Accordingly, as described in the first embodiment of the present invention, the handwritten image that is transmitted to the control center 38 is added and registered into the control DB 44.

In step 298, in accordance with the writing-conditions that are indicated by the obtained writing-condition information from control information in the previous step 278, and the recognized orientation of the document in the previous step 284 (the orientation of the document which has been written on the reading-object electronic paper 12), the received document information from the control server 40 of the control center 38 is converted to bitmap data. Accordingly, a writing image is formed for rewriting the document that has been written on the reading-object electronic paper 12 (the document which has been deleted from the reading-object electronic paper in step 290) on the reading-object electronic paper 12.

In step 300, among the writing history information that is read from the reading-object electronic paper 12 in step 286, the accumulated number of times of the writing history is incremented by 1 in preparation for a case of rewriting a document, whereby the writing history is updated. Then, in step 302, the recording section 24 rewrites a document on the reading-object electronic paper 12 by using the writing image that has been formed in step 298. Further, in step 304, the recording section 24 writes control information and the updated writing history information in step 300 on the reading-object electronic paper 12. Accordingly, the handwritten contents reading processing is completed.

Third Embodiment

A description of a third embodiment of the present invention will be made hereinafter. Further, portions identical to those shown in the first and second embodiments are denoted by the same reference numerals and a description thereof will be omitted.

As shown in FIG. 7B by denoting as "CH2", the reading section 26 according to the third embodiment of the present invention is structured to read the electronic paper 12 by using a sensor having spectral sensitivity characteristics which is sensitive only to a second wavelength region within which light reflectances of an imaging portion and a non-imaging portion of the electronic paper 12 are substantially the same, and a light reflectance of ink for a pen for handwriting is different from those of the imaging portion and the non-imaging portion of the electronic paper 12.

Figure 10:
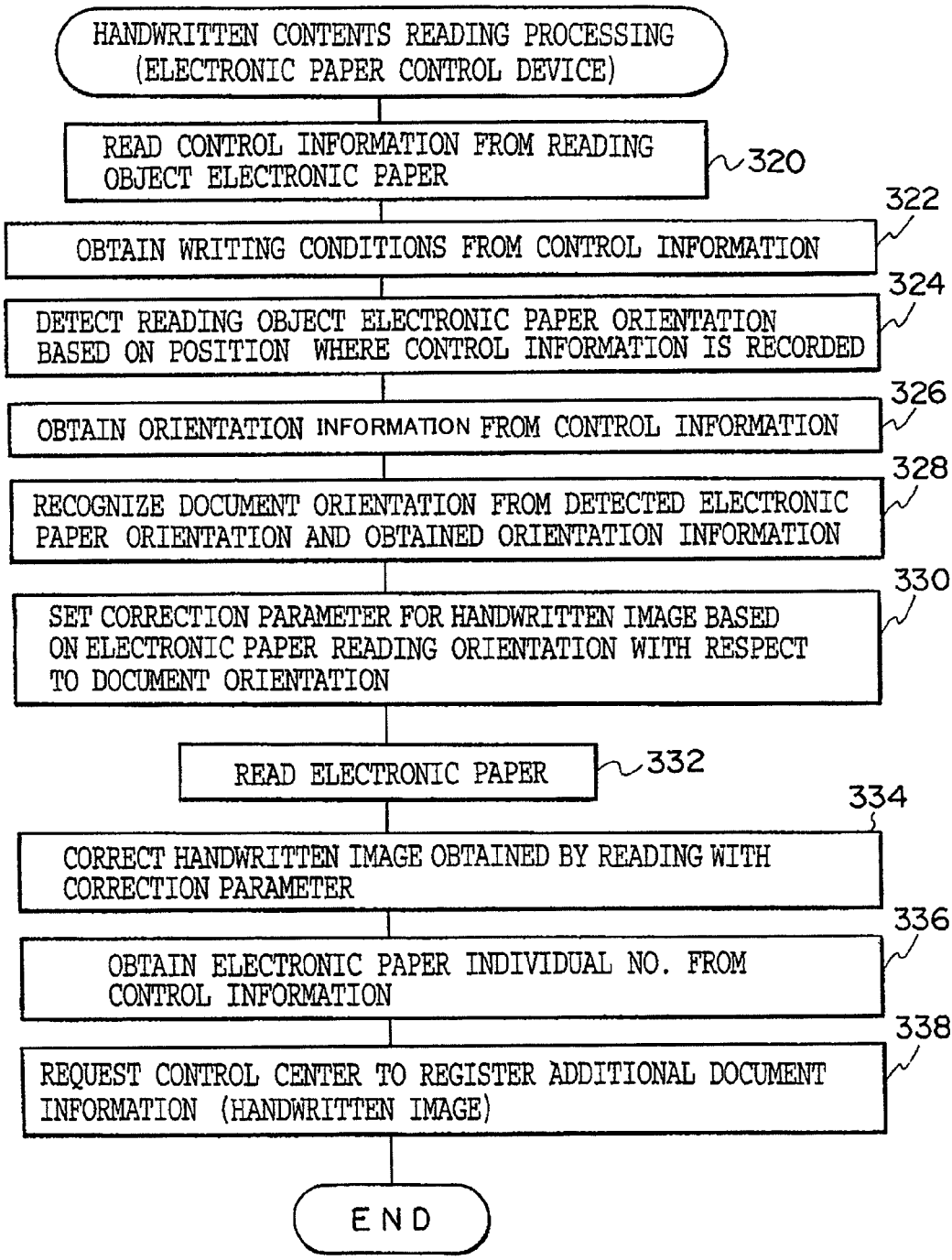
FIG. 10 is a flowchart illustrating contents of a written contents reading processing according to a third embodiment of the present invention.

With reference to a flowchart of FIG. 10, a handwritten contents reading processing according to the third embodiment of the present invention will be explained. In step 320, the reading section 26 is instructed to read control information from the reading-object electronic paper 12. Control information is read from the reading-object electronic paper 12. The outputted control information from the reading section 26 is fetched. Further, in step 322, writing-condition information that is contained in the reading control information from the reading-object electronic paper 12 is obtained from the control information.

In the same manner as in the steps 224 to 230 during the handwritten contents reading processing according to the first embodiment of the present invention (FIGS. 6A and 6B) and in the same manner as in the steps 280 to 284, 288 during the handwritten contents reading processing according to the second embodiment of the present invention (FIGS. 9A and 9B), in the next steps 324 to 330, orientation of the reading-object electronic paper 12 is detected (step 324), orientation information is obtained from the reading control information from the reading-object electronic paper 12 (step 326), orientation of a document which is written on the reading-object electronic paper 12 is recognized (step 328), and parameters for a correction processing of the handwritten image are defined (step 330).

In step 332, the reading-object electronic paper 12 is read by the reading section 26. Further, this step 332, together with the reading section 26 for reading the reading-object electronic paper 12 correspond to the reading component of the present invention.

As described above, as is shown in FIG. 7B by denoting as "CH2", the reading section 26 according to the third embodiment of the present invention reads the electronic paper 12 by using a sensor having spectral sensitivity characteristics which is sensitive only to a second wavelength region within which light reflectances of the imaging portion and the non-imaging portion of the electronic paper 12 are substantially the same, and a light reflectance of ink for a pen for handwriting is different from those of the imaging portion and the non-imaging portion of the electronic paper 12. Accordingly, a complicated processing such as the separation of the handwritten image from the read image as in the handwritten contents reading processing according to the first embodiment of the present invention (FIGS. 6A and 6B) is not required, and instead, the reading-object electronic paper 12 is simply read in step 332, whereby the handwritten image representing contents with which the reading-object electronic paper 12 is filled out by hand (sometimes referred to as "handwritten contents") can be obtained.

In step 334, in the same manner in step 250 during the handwritten contents reading processing (FIGS. 6A and 6B) according to the first embodiment of the present invention, and in step 294 during the handwritten contents reading processing (FIGS. 9A and 9B), various correction processings are conducted on the handwritten image resulting from reading in step 332 by using the parameters defined in the previous step 330. Further, in step 336, an individual number of the reading-object electronic paper 12 is obtained from the reading control information from the reading-object electronic paper 12 in the previous step 320.

Then, in step 338, the handwritten image which has experienced a correction processing, and the obtained individual number of the reading-object electronic paper 12 in step 336 are transmitted to the control server 40 of the control center 38, and the control center 38 is requested to add and register the handwritten image into the control DB 44. Accordingly, the handwritten image that is transmitted to the control center 38 is added and registered to the control DB 44.

In the above-description, when the document which is represented by document information and the handwritten contents which are represented by the handwritten image are written on the electronic paper 12, in order to orient both the document and the handwritten contents in the same direction, an example has been explained in which the handwritten image which has previously received a rotational processing is registered in the control DB 44. However, instead of this, information indicating a relationship between orientation of the document which is written on the electronic paper 12 and that of the contents with which the electronic paper 12 is filled out by hand, and the handwritten image are previously registered in the control DB 44, and when the document represented by document information and the handwritten contents represented by a handwritten image are written on the electronic paper 12, a rotational processing can be conducted on the handwritten image based on the aforementioned information. The present invention also contains the above-described aspect.

Further, in the above-description, an example has been explained in which handwritten image (or information containing the handwritten image) representing contents with which the electronic paper 12 is filled out by hand is associated with each individual number of each electronic paper 12 and then controlled at the control center 38. However, the present invention is not limited to this, and instead, identification information of each electronic paper 12 can be associated with handwritten image or document information corresponding to each electronic paper, and then stored and controlled by the electronic paper control device 10. If a large capacity IC chip is mounted on each electronic paper 12, handwritten image or document information can be stored in the IC chip mounted on each electronic paper 12.

Although it depends on the structure of an electronic paper for use, usually, an electronic paper has characteristics such that, after days have elapsed since a document (image) was written on the electronic paper, image quality of the written document (written image) deteriorates. For this reason, for each electronic paper on which a document has been written, it is determined whether or not the number of days that have elapsed since the last date on which document was written on the electronic paper exceeds a predetermined value or it is determined whether or not the degree of deterioration of image quality of the document exceeds a predetermined value by optically reading the document which is written on the electronic paper. If the determination is affirmed, a refresh processing in which the document that has already been written on the electronic paper is rewritten on the same electronic paper is carried out.

In an aspect in which it is determined whether or not the refresh processing is required based on the number of days which have elapsed since a document was last written, the aspect can be structured such that date/time a document is written ("document writing date/time", hereinafter) which is the date/time the document was finally written is recorded on an electronic paper or a recording medium separated from the electronic paper each time a document is written on an electronic paper, and the document writing date/time can be recognized by reading a document writing date/time from the electronic paper or the recording medium. Further, if the document writing date/time is registered in the control DB 44 in advance, the control center 38 can determine whether or not the refresh processing is required, based on the number of days since a document was finally written on an electronic paper. If an electronic paper that requires the refresh processing does exist, it is possible to inform the electronic paper control device 10 of the existence of the electronic paper.

More specifically, it is determined whether or not the refresh processing is required based on the degree of deterioration of image quality of a document, which is written on an electronic paper as described below.

Document information corresponding to the document which is written on the electronic paper 12 that is supposed to a determination (hereinafter, "determination-object electronic paper") is obtained from the control DB 44 of the control center 38. Based on the obtained document information and the writing-condition information that is contained in the reading control information from the determination-object electronic paper 12, a document image which represents the document which has been displayed on the electronic paper 12 is generated just after the document has been written on the determination-object electronic paper 12. Then, the determination-object electronic paper 12 (or a document, which is written thereon) is optically read. Due to the determination whether or not a difference between a density (estimated value) of the document represented by the generated document image and the read density is more than a predetermined value (for example, determination whether or not a ratio of an area of a region whose optical density difference is about 0.01 or more to an area of the entire document which is written on the electronic paper 12 exceeds a predetermined value), it can be determined whether or not a degree of deterioration of image quality of a document exceeds a predetermined value.

Due to the above-described determinations, if the refresh processing is determined to be required, the refresh processing in which the document which has already been written on the electronic paper 12 which is determined to require the refresh processing is rewritten on the same electronic paper is carried out, whereby deterioration of image quality of the document which has already been written on the electronic paper can be prevented.

What is claimed is:

1. An electronic paper reading device comprising:
   a delete control component for deleting a display of a first image from an electronic paper which is filled out by hand in a state in which a first image which has been recorded on the electronic paper in advance, is being displayed;
   a reading component for obtaining image data of a second image representing contents with which the electronic paper is filled out by hand, by optically reading the electronic paper from which the display of the first image has been deleted by the delete control component; and
   a control component which recognizes identification information for identifying the electronic paper which is filled out by hand, and which associates the obtained image data of the second image with the identification information and manages the image data.

2. The device of claim 1, further comprising a detection component for detecting a relationship between orientation of the electronic paper or the first image, and that of the second image, wherein, based on the relationship that is detected by the detection component, the control component controls the image data of the second image to orient the first image and the second image in the same direction when both the first image and the second image are recorded on the electronic paper.

* * * * *